(12) United States Patent
Pan et al.

(10) Patent No.: US 12,356,476 B1
(45) Date of Patent: Jul. 8, 2025

(54) METHOD AND APPARATUS FOR REMOTE UE SUPPORTING LINK IDENTIFIER UPDATE PROCEDURE IN UE-TO-UE RELAY COMMUNICATION IN A WIRELESS COMMUNICATION SYSTEM

(71) Applicant: ASUS Technology Licensing Inc., Taipei (TW)

(72) Inventors: Li-Te Pan, Taipei (TW); Li-Chih Tseng, Taipei (TW); Yu-Hsuan Guo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/086,920

(22) Filed: Mar. 21, 2025

Related U.S. Application Data

(60) Provisional application No. 63/568,489, filed on Mar. 22, 2024.

(51) Int. Cl.
*H04W 76/14* (2018.01)
*H04W 76/15* (2018.01)
*H04W 88/04* (2009.01)

(52) U.S. Cl.
CPC ............ *H04W 76/14* (2018.02); *H04W 76/15* (2018.02); *H04W 88/04* (2013.01)

(58) Field of Classification Search
CPC ..... H04W 76/14; H04W 76/15; H04W 88/04; H04W 92/18
See application file for complete search history.

(56) References Cited

FOREIGN PATENT DOCUMENTS

WO    WO-2022150542 A1 *  7/2022  ............ H04W 12/03

* cited by examiner

*Primary Examiner* — Thomas R Cairns
(74) *Attorney, Agent, or Firm* — Blue Capital Law Firm, P.C.

(57) ABSTRACT

The first UE establishes a PC5 connection with a relay UE for supporting a relay communication between the first UE and a second UE via the relay UE, wherein a direct link context associated with the relay communication includes a layer-2 Identity (ID) of the second UE. The first UE initiates a link identifier update (LIU) procedure with the second UE via the relay UE, wherein the first UE receives a LIU response message from the second UE in the LIU procedure, and the LIU response message includes a new layer-2 ID of the second UE. The first UE does not update the direct link context with the new layer-2 ID of the second UE or the first UE keeps the layer-2 ID of the second UE in the direct link context without updating the direct link context with the new layer-2 ID of the second UE.

20 Claims, 24 Drawing Sheets

| IEI | Information Element | Type/Reference | Presence | Format | Length |
|---|---|---|---|---|---|
| | PROSE DIRECT LINK IDENTIFIER UPDATE REQUEST message identity | ProSe PC5 signalling message type 11.3.1 | M | V | 1 |
| | Sequence number | Sequence number 11.3.2 | M | V | 1 |
| | MSB of $K_{NRP\text{-}sess}$ ID | MSB of $K_{NRP\text{-}sess}$ ID 11.3.13 | M | V | 1 |
| | Source layer-2 ID | Layer-2 ID 11.3.25 | M | V | 3 |
| 27 | Source user info | Application layer ID 11.3.4 | O | TLV | 3-257 |
| 60 | Source link local IPv6 address | Link local IPv6 address 11.3.7 | O | TV | 17 |
| A- | IP address/prefix needed indication | IP address/prefix needed indication 11.3.42 | O | TV | 1 |
| 69 | List of target end UE user info | Target Application layer ID 11.3.4 | O | TLV | 3-257 |
| 6A | List of target end UE IP address/prefix | List of Link local IPv6 addresses 11.3.z | O | TLV | 17-257 |

FIG. 11 (PRIOR ART)

| IEI | Information Element | Type/Reference | Presence | Format | Length |
|---|---|---|---|---|---|
| | PROSE DIRECT LINK IDENTIFIER UPDATE ACCEPT message identity | ProSe PC5 signalling message type 11.3.1 | M | V | 1 |
| | Sequence number | Sequence number 11.3.2 | M | V | 1 |
| | LSB of $K_{NRP\text{-}sess}$ ID | LSB of $K_{NRP\text{-}sess}$ ID 11.3.15 | M | V | 1 |
| | MSB of $K_{NRP\text{-}sess}$ ID | MSB of $K_{NRP\text{-}sess}$ ID 11.3.13 | M | V | 1 |
| | Source layer-2 ID | Layer-2 ID 11.3.25 | M | V | 3 |
| | Target layer-2 ID | Layer-2 ID 11.3.25 | M | V | 3 |
| 28 | Target user info | Application layer ID 11.3.4 | O | TLV | 3-257 |
| 61 | Target link local IPv6 address | Link local IPv6 address 11.3.7 | O | TV | 17 |
| 27 | Source user info | Application layer ID 11.3.4 | O | TLV | 3-257 |
| 60 | Source link local IPv6 address | Link local IPv6 address 11.3.7 | O | TV | 17 |

FIG. 12 (PRIOR ART)

| IEI | Information Element | Type/Reference | Presence | Format | Length |
|---|---|---|---|---|---|
|  | PROSE DIRECT LINK IDENTIFIER UPDATE ACK message identity | ProSe PC5 signalling message type 11.3.1 | M | V | 1 |
|  | Sequence number | Sequence number 11.3.2 | M | V | 1 |
|  | LSB of $K_{NRP-sess}$ ID | LSB of $K_{NRP-sess}$ ID 11.3.15 | M | V | 1 |
|  | Target layer-2 ID | Layer-2 ID 11.3.25 | M | V | 3 |
| 28 | Target user info | Application layer ID 11.3.4 | O | TLV | 3-257 |
| 61 | Target link local IPv6 address | Link local IPv6 address 11.3.7 | O | TV | 17 |
| 6B | Source link local IPv6 address | IPv6 address 11.3.7 | O | TLV | 17 |

FIG. 13 (PRIOR ART)

ize: medium;"># METHOD AND APPARATUS FOR REMOTE UE SUPPORTING LINK IDENTIFIER UPDATE PROCEDURE IN UE-TO-UE RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/568,489 filed on Mar. 22, 2024, the entire disclosure of which is incorporated herein in its entirety by reference.

FIELD

This disclosure generally relates to wireless communication networks, and more particularly, to a method and apparatus remote User Equipment (UE) supporting link identifier update procedure in UE-to-UE relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a first User Equipment (UE) are disclosed. In one embodiment, the first UE establishes a PC5 connection with a relay UE for supporting a relay communication between the first UE and a second UE via the relay UE, wherein a direct link context associated with the relay communication includes a layer-2 Identity (ID) of the second UE. The first UE also initiates a link identifier update (LIU) procedure with the second UE via the relay UE, wherein the first UE receives a LIU response message from the second UE in the LIU procedure, and the LIU response message includes a new layer-2 ID of the second UE. Furthermore, the first UE does not update the direct link context with the new layer-2 ID of the second UE or the first UE keeps the layer-2 ID of the second UE in the direct link context without updating the direct link context with the new layer-2 ID of the second UE.

BRIEF DESCRIPTION OF THE DRAWINGS

FIG. 11 is a reproduction of Table 10.3.18.1.1 of 3GPP TS 24.554 V18.3.0.

FIG. 12 is a reproduction of Table 10.3.19.1.1 of 3GPP TS 24.554 V18.3.0.

FIG. 13 is a reproduction of Table 10.3.20.1.1 of 3GPP TS 24.554 V18.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V18.4.0, "Proximity based Services (ProSe) in the 5G System (5GS) (Release 18)"; TS 24.554 V18.3.0, "Proximity-services (ProSe) in 5G System (5GS) protocol aspects; Stage 3 (Release 18)"; TS 38.300 V18.0.0, "NR; NR and NG-RAN Overall Description; Stage 2 (Release 18)"; and 3GPP RAN2 #125 meeting chairman notes. The standards and documents listed above are hereby expressly incorporated by reference in their entirety.

Figure 1:
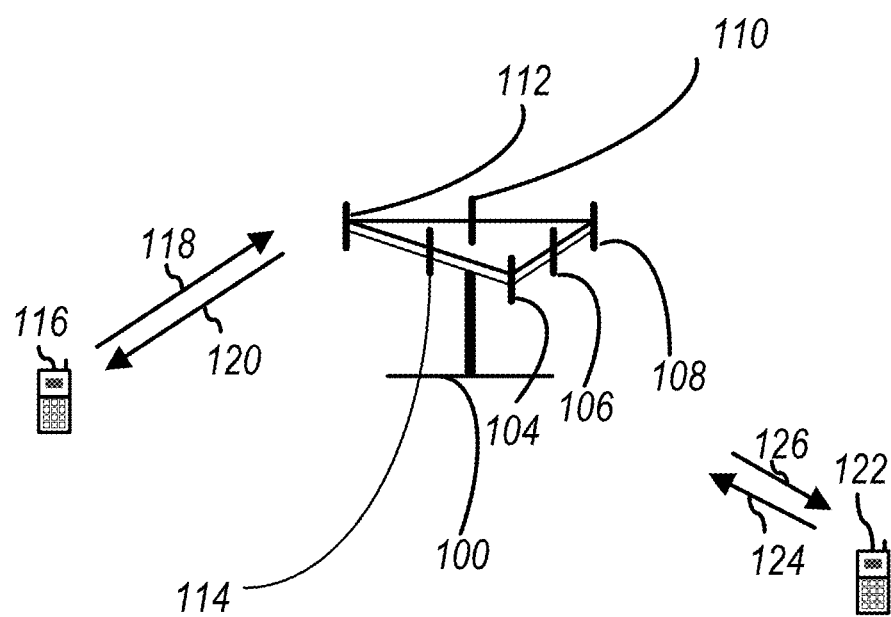
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
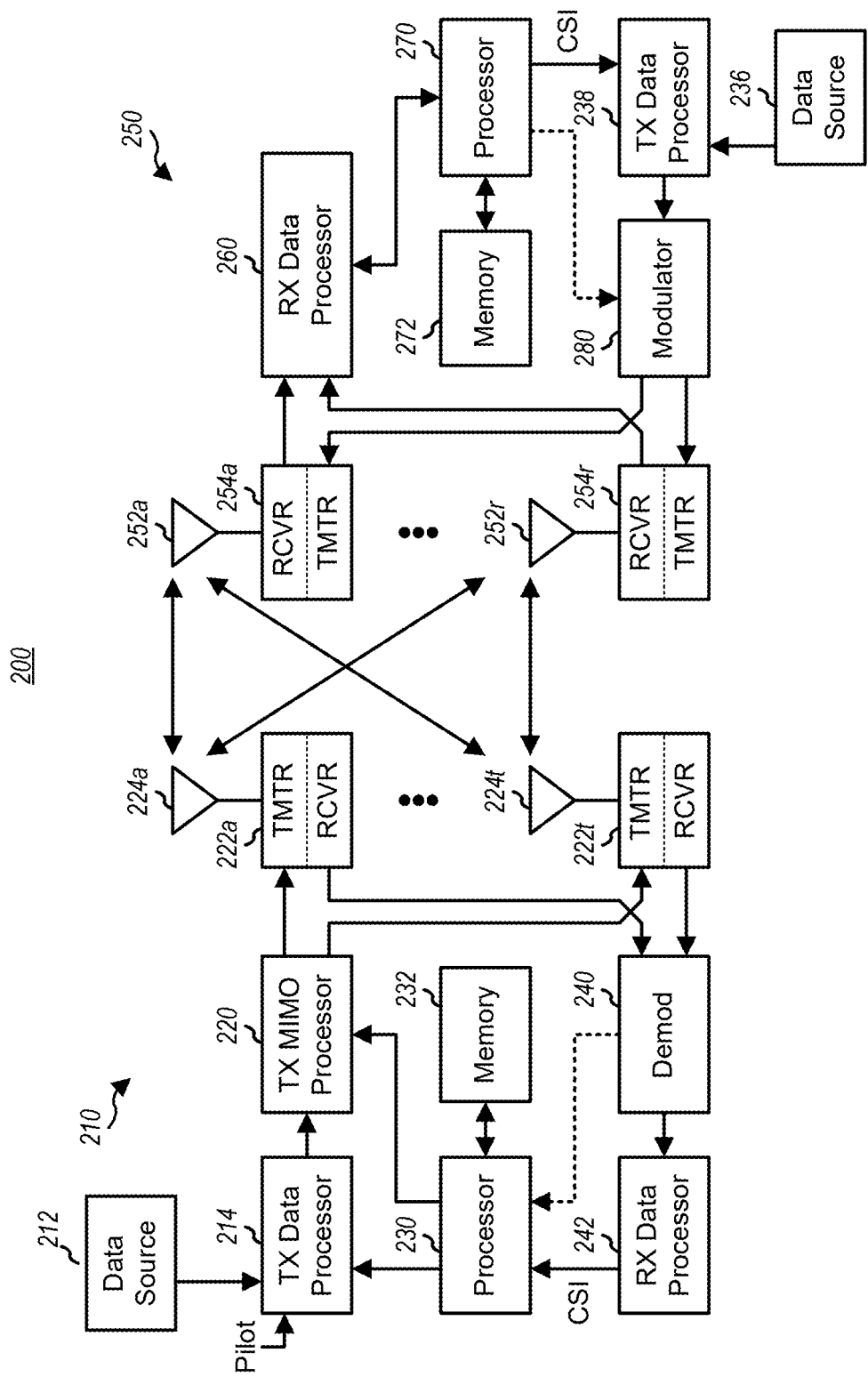
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
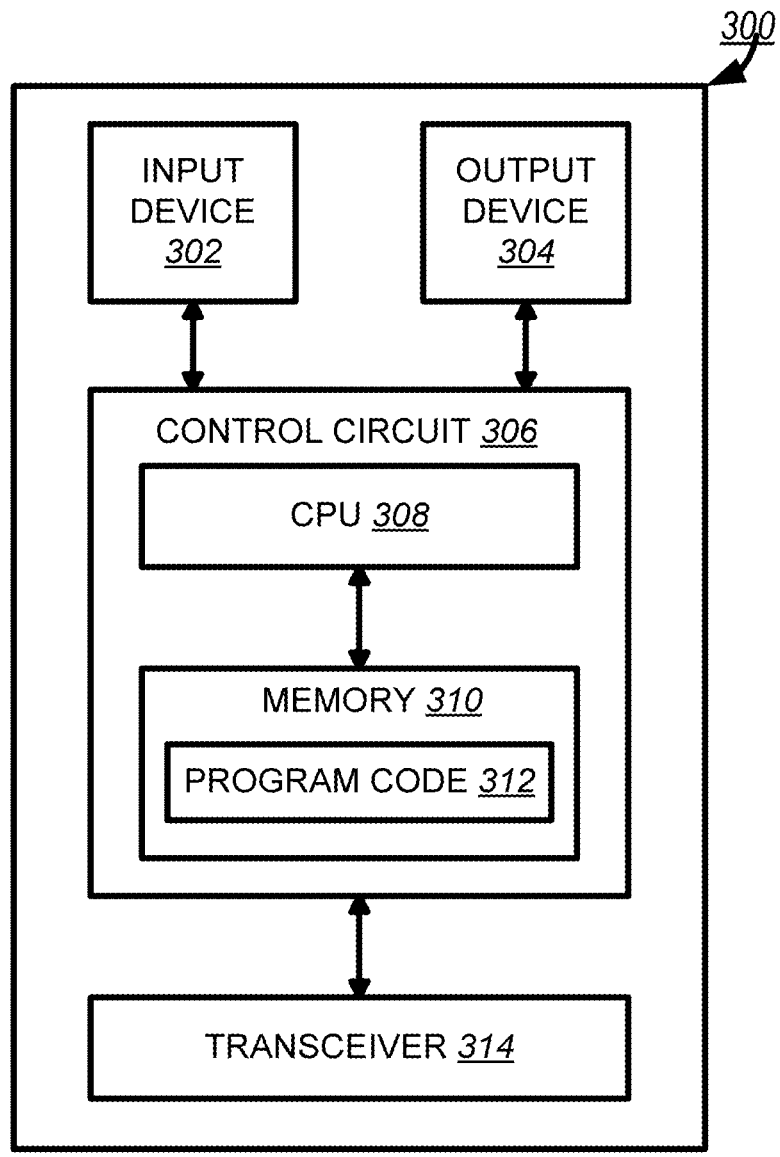
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
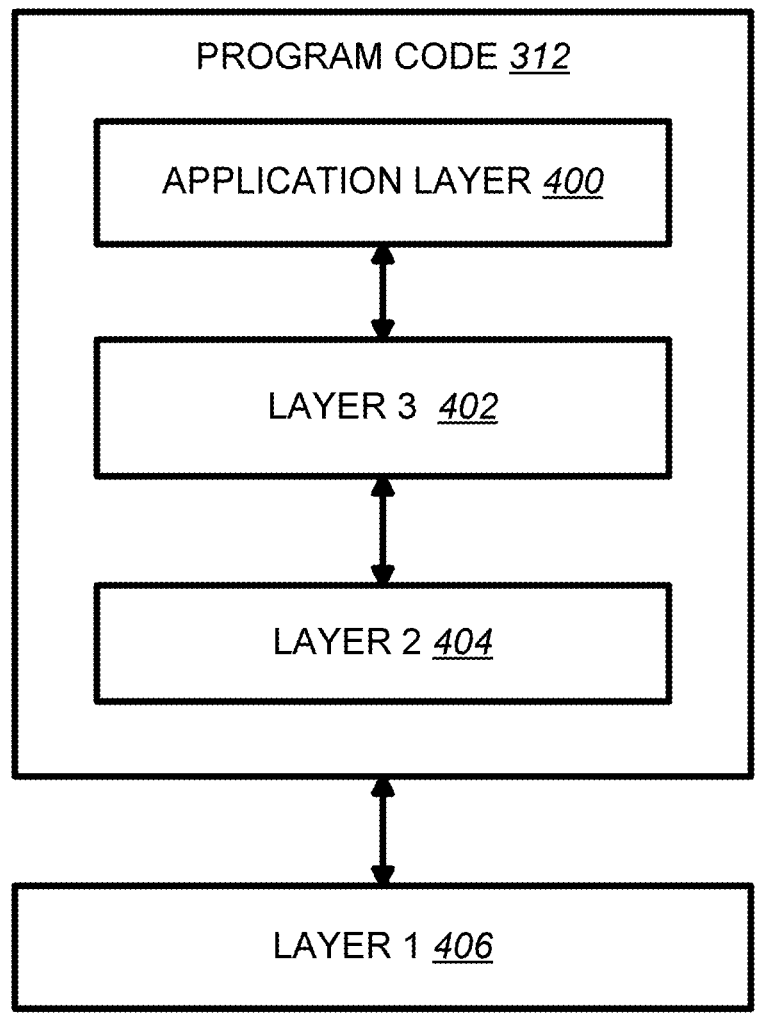
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following concepts:
5.3.4 Unicast Mode 5G ProSe Direct Communication Unicast mode of 5G ProSe direct communication is supported over NR based PC5 reference point. A PC5 unicast link between two UEs is established for the 5G ProSe direct communication; and the PC5 unicast link could be maintained, modified and released according to the application layer requests or communication requirements.

For the PC5 unicast link of the 5G ProSe direct communication, the principal for the PC5 unicast link of V2X communication described in TS 23.287 [2] clause 5.2.1.4 is reused with the following differences:
V2X service is replaced by ProSe Application;
V2X service type is replaced by ProSe identifier;
New data unit types are supported (including IPv4, Ethernet and Unstructured).
For IP type 5G ProSe direct communication over PC5 reference point, the mechanism for IP address/prefix allocation is described in clause 5.5.1.1. The PC5 QoS handling for the unicast mode 5G ProSe direct communication is specified in clause 5.6.1.
[ . . . ]
5.8.2.1 General Each UE has one or more Layer-2 IDs for 5G ProSe direct communication over PC5 reference point, consisting of:
Source Layer-2 ID(s); and
Destination Layer-2 ID(s).
Source and Destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames. The selection of the Source and Destination Layer-2 ID(s) by a UE depends on the communication mode of 5G ProSe direct communication over PC5 reference point for this layer-2 link, as described in clauses 5.8.2.2, 5.8.2.3 and 5.8.2.4. The Source Layer-2 IDs may differ between different communication modes.
[ . . . ]

5.8.2.4 Identifiers for Unicast Mode 5G ProSe Direct Communication

For unicast mode of 5G ProSe direct communication over PC5 reference point, the Destination Layer-2 ID used depends on the communication peer. The Layer-2 ID of the communication peer, identified by the peer's Application Layer ID, may be discovered during the establishment of the PC5 unicast link, or known to the UE via prior ProSe direct communications, e.g. existing or prior unicast link to the same Application Layer ID, or obtained from 5G ProSe direct discovery process. The initial signalling for the establishment of the PC5 unicast link may use the known Layer-2 ID of the communication peer, or a default destination Layer-2 ID associated with the ProSe service (i.e. ProSe identifier) configured for PC5 unicast link establishment, as specified in clause 5.1.3.1. During the PC5 unicast link establishment procedure, Layer-2 IDs are exchanged and should be used for future communication between the two UEs, as specified in clause 6.4.3.

The UE maintains a mapping between the Application Layer IDs and the source Layer-2 IDs used for the PC5 unicast links, as the ProSe application layer does not use the Layer-2 IDs. This allows the change of source Layer-2 ID without interrupting the ProSe applications.

When Application Layer IDs change, the source Layer-2 ID(s) of the PC5 unicast link(s) shall be changed if the link(s) was used for 5G ProSe communication with the changed Application Layer IDs.

Figure 5:
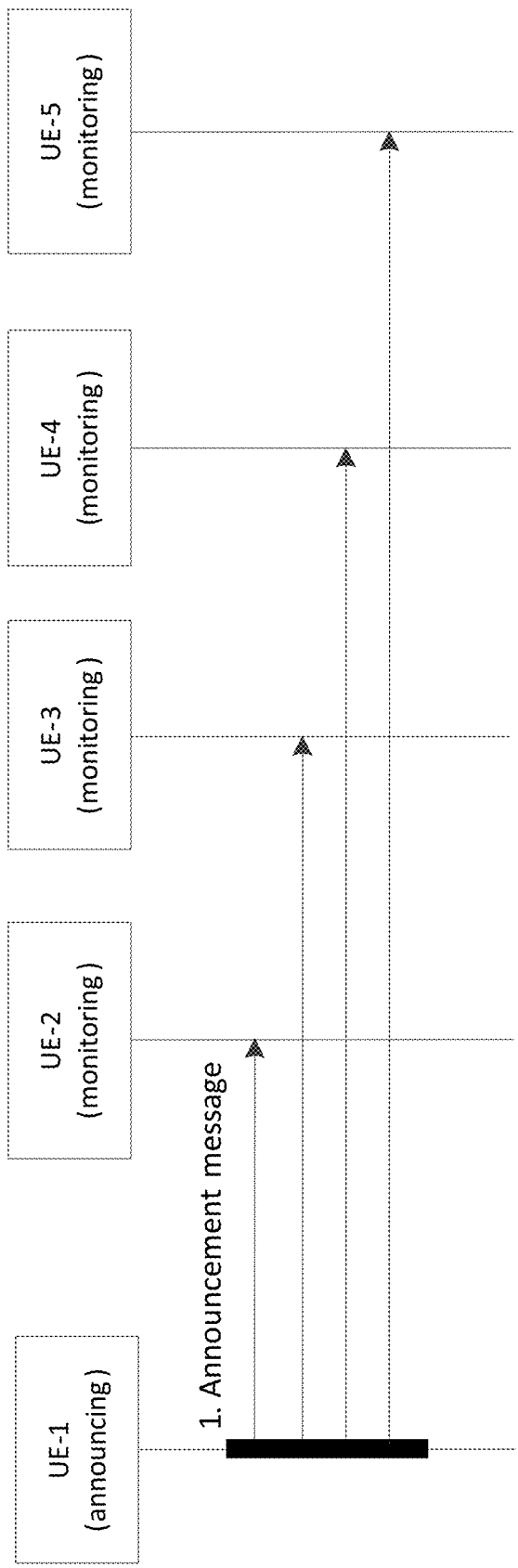
FIG. 5 is a reproduction of Figure 6.3.2.1-1 of 3GPP TS 23.304 V18.4.0.

Based on privacy configuration as specified in clause 5.1.3.1, the update of the new identifiers of a source UE to the peer UE for the established unicast link may cause the peer UE to change its Layer-2 ID and optionally IP address/prefix if IP communication is used as defined in clause 6.4.3.2.
[ . . . ]
6.3.2 5G ProSe Direct Discovery Procedures Over PC5 Reference Point
6.3.2.1 General A PC5 communication channel is used to carry the discovery message over PC5 and the discovery message over PC5 is differentiated from other PC5 messages by AS layer. Both Model A and Model B discovery as defined in TS 23.303 [3] are supported:
Model A uses a single discovery protocol message (Announcement).
Model B uses two discovery protocol messages (Solicitation and Response).
Depicted in Figure 6.3.2.1-1 is the procedure for 5G ProSe Direct Discovery with Model A.
[Figure 6.3.2.1-1 of 3GPP TS 23.304 V18.4.0, Entitled "5G ProSe Direct Discovery with Model A", is Reproduced as FIG. 5]
1. The Announcing UE sends an Announcement message.
The Announcement message may include the Type of Discovery Message, ProSe Application Code or ProSe Restricted Code, security protection element, [metadata information]. The Application layer metadata information may be included as metadata in the Announcement message.
The Destination Layer-2 ID and Source Layer-2 ID used to send the Announcement message are specified in clause 5.8.1.2 and clause 5.8.1.3.
The Monitoring UE determines the Destination Layer-2 ID for signalling reception. The Destination Layer-2 ID is configured with the UE(s) as specified in clause 5.8.1.2.

Figure 6:
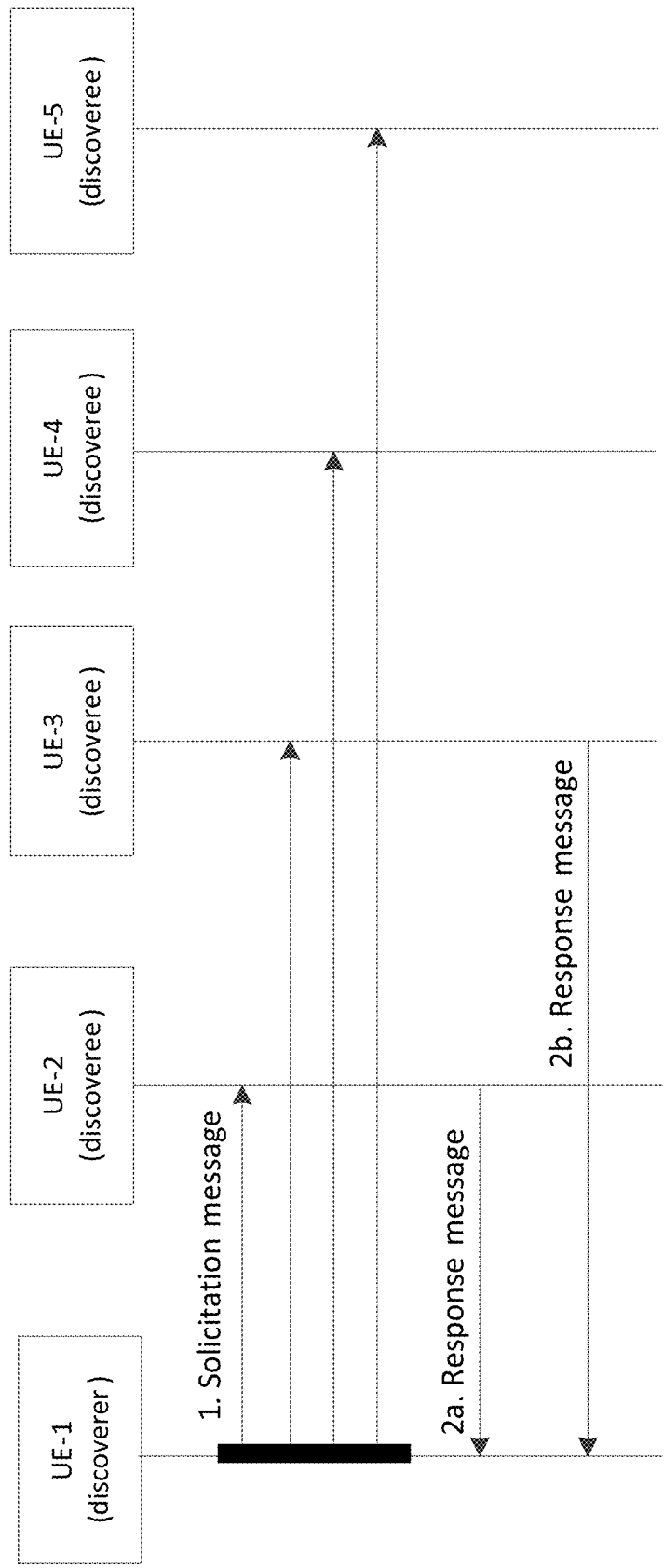
FIG. 6 is a reproduction of Figure 6.3.2.1-2 of 3GPP TS 23.304 V18.4.0.

Depicted in Figure 6.3.2.1-2 is the procedure for 5G ProSe Direct Discovery with Model B.

[Figure 6.3.2.1-2 of 3GPP TS 23.304 V18.4.0, Entitled "5G ProSe Direct Discovery with Model B", is Reproduced as FIG. 6]

1. The Discoverer UE sends a Solicitation message. The Solicitation message may include Type of Discovery Message, ProSe Query Code, security protection element.

The Destination Layer-2 ID and Source Layer-2 ID used to send the Solicitation message are specified in clause 5.8.1.2 and clause 5.8.1.3.

How the Discoveree UE determines the Destination Layer-2 ID for signalling reception is specified in clause 5.8.1.2.

2. The Discoveree UE that matches the solicitation message responds to the Discoverer UE with the Response message. The Response message may include Type of Discovery Message, ProSe Response Code, security protection element, [metadata information]. The Application layer metadata information may be included as metadata in the Response message.

The Source Layer-2 ID used to send the Response message is specified in clause 5.8.1.3.

The Destination Layer-2 ID is set to the Source Layer-2 ID of the received Solicitation message.

NOTE: Details of security protection element are specified in TS 33.503 [29].

[ . . . ]

6.4.3.1 Layer-2 Link Establishment Over PC5 Reference Point

To perform unicast mode of ProSe Direct communication over PC5 reference point, the UE is configured with the related information as described in clause 5.1.3.

Figure 6.4.3.1-1 shows the layer-2 link establishment procedure for the unicast mode of ProSe Direct communication over PC5 reference point.

Figure 7:
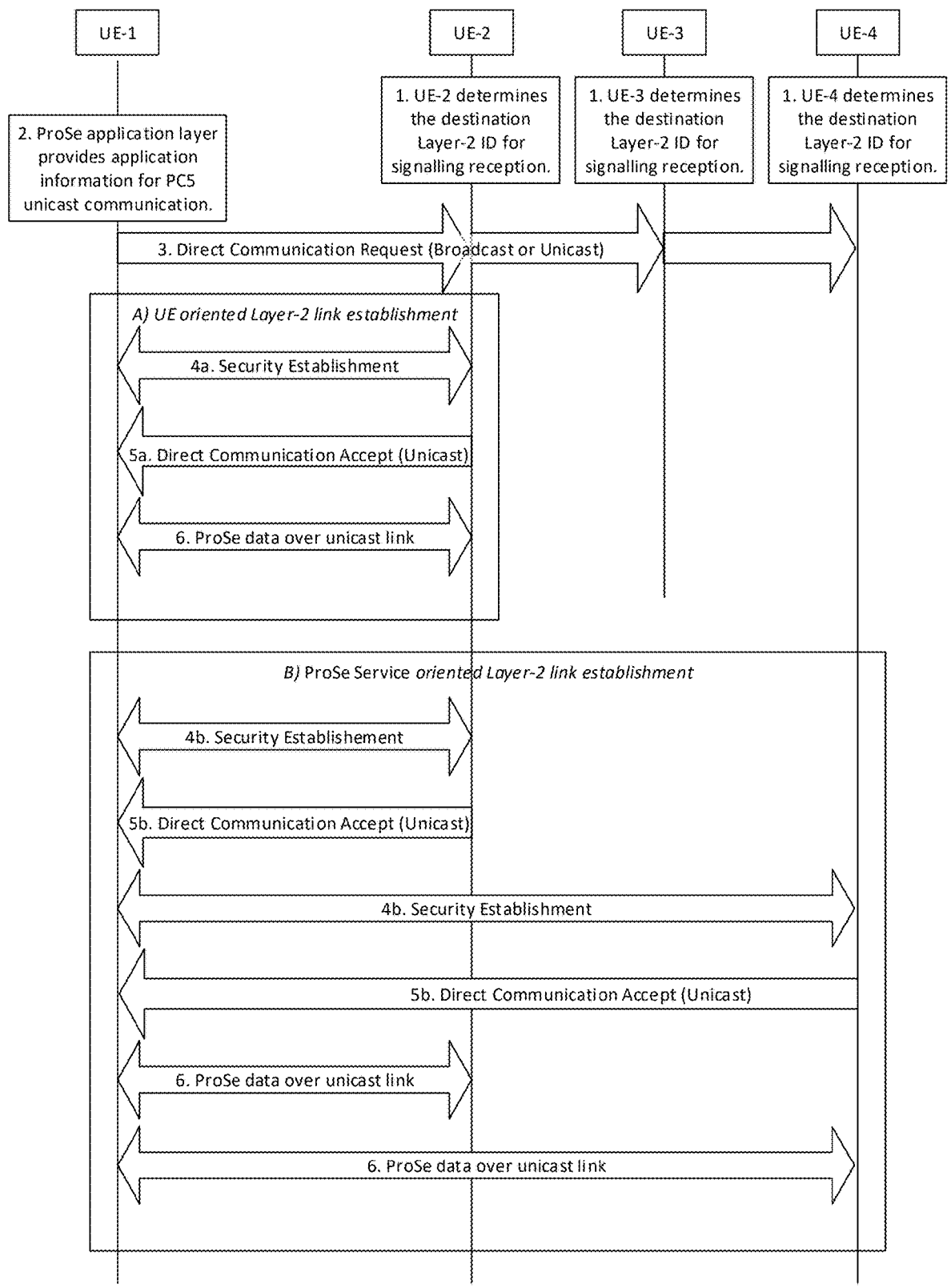
FIG. 7 is a reproduction of Figure 6.4.3.1-1 of 3GPP TS 23.304 V18.4.0.

[Figure 6.4.3.1-1 of 3GPP TS 23.304 V18.4.0, Entitled "Layer-2 Link Establishment Procedure", is Reproduced as FIG. 7]

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined in TS 33.503 [29].

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

A default PC5 DRX configuration may be used for transmitting and receiving of this message (see TS 38.300 [12]).

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined in TS 33.503 [29].

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPV6 address allocation mechanism is supported by the initiating UE, i.e., acting as an IPV6 Router; or "DHCPv4 server & IPV6 Router" if both IPv4 and IPV6 address allocation mechanism are supported by the initiating UE; or "address allocation not supported" if neither IPv4 nor IPv6 address allocation mechanism is supported by the initiating UE.

Link-Local IPV6 Address: a link-local IPv6 address formed locally based on RFC 4862 if UE-1 does not support the IPV6 IP address allocation mechanism, i.e. the IP Address Configuration indicates "address allocation not supported".

QoS Info: the information about PC5 QOS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in Figure 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QOS parameters requested by UE-1 (i.e. PQI and conditionally other parameters such as MFBR/GFBR, etc.) and optionally the associated ProSe identifiers(s).

Optional PC5 QoS Rule(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPV6 Router; or "DHCPv4 server & IPv6 Router" if both IPv4 and IPV6 address allocation mechanism are supported by the target UE; or "address allocation not supported" if neither IPv4 nor IPV6 address allocation mechanism is supported by the target UE.

Link-Local IPv6 Address: a link-local IPv6 address formed locally based on RFC 4862 if the target UE does not support the IPV6 IP address allocation mechanism, i.e. the IP Address Configuration indicates "address allocation not supported" and UE-1 included a link-local IPV6 address in the security establishment in step 4. The target UE shall include a non-conflicting link-local IPv6 address.

If both UEs (i.e. the initiating UE and the target UE) are selected to use link-local IPV6 address, they shall disable the duplicate address detection defined in RFC 4862 [17].

NOTE 3: When either the initiating UE or the target UE indicates the support of IPV6 routing, the corresponding address configuration procedure would be carried out after the establishment of the layer 2 link and the link-local IPV6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Two UEs may negotiate the PC5 DRX configuration in the AS layer and the PC5 DRX parameter values can be configured per pair of source and destination Layer-2 IDs in the AS layer.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

6.4.3.2 Link Identifier Update for a Unicast Link

Figure 6.4.3.2-1 shows the link identifier update procedure for a unicast link. When privacy requirements are configured for a ProSe Identifier associated with the unicast link, identifiers used for the unicast mode of 5G ProSe communication over PC5 reference point (e.g. Application Layer ID, Source Layer-2 ID and IP address/prefix) shall be changed over time as specified in clauses 5.8.2.1 and 5.8.2.4. A UE may decide to change the identifiers for other reasons, e.g. application layer requirement. This procedure is used to update and exchange new identifiers between the source and the peer UEs for a unicast link before using the new identifiers, to prevent service interruptions. When there are privacy requirements as indicated above, this procedure is executed over a security protected unicast link.

If a UE has multiple unicast links using the same Application Layer IDs or Layer-2 IDs, the UE needs to perform the link identifier update procedure over each of the unicast links.

Figure 8:
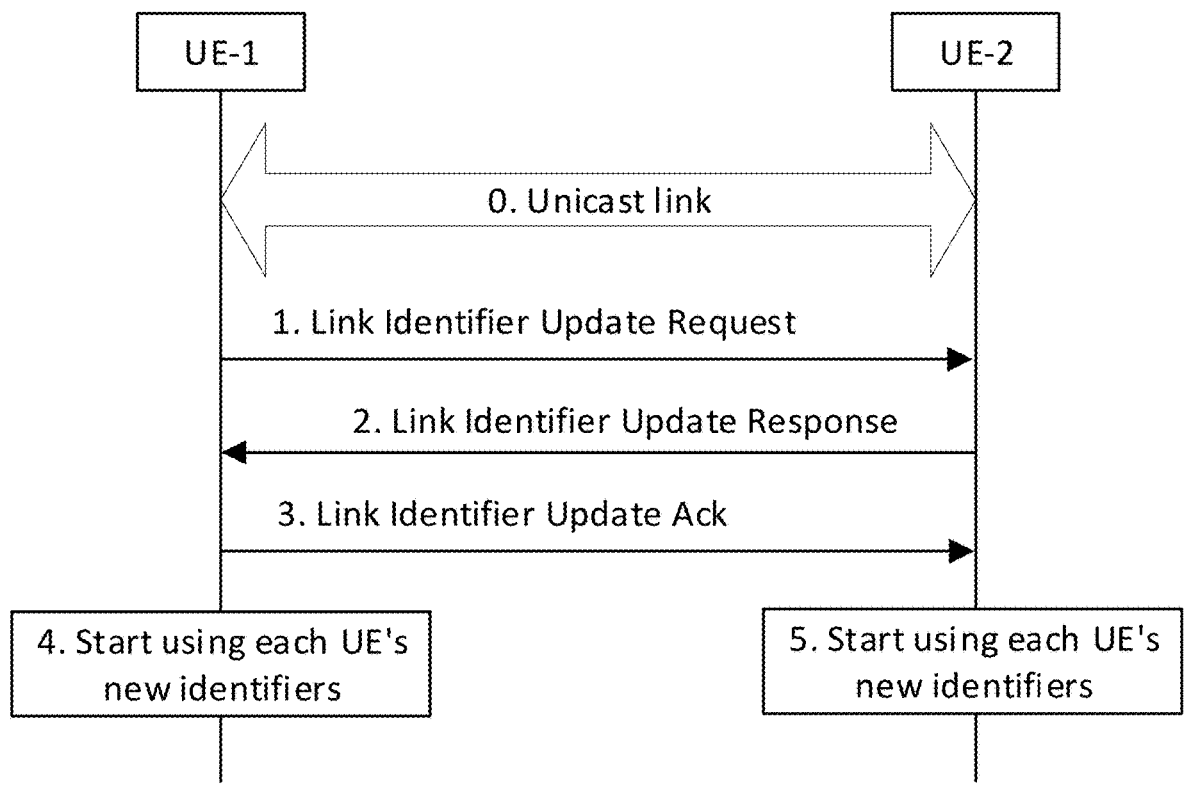
FIG. 8 is a reproduction of Figure 6.4.3.2-1 of 3GPP TS 23.304 V18.4.0.

[Figure 6.4.3.2-1 of 3GPP TS 23.304 V18.4.0, Entitled "Link Identifier Update Procedure", is Reproduced as FIG. 8]

0. UE-1 and UE-2 have a unicast link established as described in clause 6.4.3.1.

1. UE-1 decides to change its identifier(s), e.g. due to the Application Layer ID change or upon expiry of a timer. UE-1 generates its new Layer-2 ID and sends a Link Identifier Update Request message to UE-2 using the old identifiers.

The Link Identifier Update Request message includes the new identifier(s) to use (including the new Layer-2 ID, Security Information, optionally the new Application Layer ID and optionally new IP address/prefix if IP communication is used). The new identifier(s) shall be cyphered to protect privacy if security is configured for the unicast link. After sending the Link Identifier Update Request message, if the UE-1 has data to send, UE-1 keeps sending data traffic to UE-2 with the old identifiers until UE-1 sends the Link Identifier Update Ack message to UE-2.

NOTE 1: The timer is running on per Source Layer-2 ID.

NOTE 2: When one of the two UEs acts as IPv6 router as described in clause 5.5.1.1 and the IP address/prefix also needs to be changed, the corresponding address configuration procedure would be carried out after the Link Identifier update procedure.

2. Upon reception of the Link Identifier Update Request message, UE-2 changes its identifier(s). UE-2 responds with a Link Identifier Update Response message which includes the new identifier(s) to use (including the new Layer-2 ID, Security Information, optionally the new Application Layer ID and optionally a new IP address/prefix if IP communication is used). The new identifier(s) shall be cyphered to protect privacy if security is configured for the unicast link. The Link Identifier Update Response message is sent using the old identifiers. UE-2 continues to receive traffic with the old Layer-2 ID from UE-1 until UE-2 receives traffic with the new Layer-2 ID from UE-1. After sending the Link Identifier Update Response message, UE-2 keeps sending data traffic to UE-1 with the old identifier, if UE-2 has data to send, until UE-2 receives the Link Identifier Update Ack message from UE-1.

3. Upon reception of the Link Identifier Update Response message, UE-1 responds with a Link Identifier Update Ack message. The Link Identifier Update Ack message includes the new identifier(s) from UE-2, as received on the Link Identifier Update Response message. The Link Identifier Update Ack message is sent using the old identifiers. UE-1 continues to receive traffic with the old Layer-2 ID from UE-2 until UE-1 receives traffic with the new Layer-2 ID from UE-2.

4. The ProSe layer of UE-1 passes the PC5 Link Identifier for the unicast link and the updated Layer-2 IDs (i.e. new Layer-2 ID for UE-1 for the source and new Layer-2 ID of UE-2 for the destination) down to the AS layer. This enables the AS layer to update the provided Layer-2 IDs for the unicast link.

UE-1 starts using its new identifiers and UE-2's new identifiers for this unicast link.

5. Upon reception of the Link Identifier Update Ack message, the ProSe layer of UE-2 passes the PC5 Link Identifier for the unicast link and the updated Layer-2 IDs (i.e. new Layer-2 ID of UE-2 for the source and new Layer-2 ID for UE-1 for the destination) down to the AS layer. This enables the AS layer to update the provided Layer-2 IDs for the unicast link. UE-2 starts using its new identifiers and UE-1's new identifiers for this unicast link.

NOTE 3: The Security Information in the above messages also needs to be updated at the same time as the Layer-2 IDs. This is defined in TS 33.503 [29].

[ . . . ]

6.4.3.7 Layer-2 Link Management Over PC5 Reference Point for 5G ProSe UE-to-UE Relay 6.4.3.7.1 Common Part for Layer-2 Link Management Over PC5 Reference Point for 5G ProSe UE-to-UE Relay For the 5G ProSe Communication via 5G ProSe UE-to-UE Relay as described in clause 6.7.1 and clause 6.7.2:

The Direct Communication Request message over the first hop PC5 reference point includes:
　User Info ID of source 5G ProSe End UE: the identity of the source 5G ProSe End UE requesting relay operation.
　User Info ID of 5G ProSe UE-to-UE Relay: the identity of the UE-to-UE Relay provided to the source 5G ProSe End UE during 5G ProSe UE-to-UE Relay Discovery procedure.
　User Info ID of target 5G ProSe End UE: the identity of the target 5G ProSe End UE provided to the source 5G ProSe End UE during UE-to-UE Relay Discovery procedure.
　(optional) Destination Layer-2 ID of target 5G ProSe End UE: the unicast destination Layer-2 ID of the target 5G ProSe End UE determined by the source 5G ProSe End UE as specified in clause 5.8.2.4.
　ProSe Service Info: the information about the ProSe identifier(s) requesting Layer-2 link establishment.
　RSC: the connectivity service provided by the 5G ProSe UE-to-UE Relay as requested by the source 5G ProSe End UE.
　Security Information: the information for the establishment of security for the first hop PC5 link establishment.

NOTE 1: The Security Information is defined by SA WG3.

The Direct Communication Request message over the second hop PC5 reference point includes:
　User Info ID of source 5G ProSe End UE.
　User Info ID of target 5G ProSe End UE.
　User Info ID of 5G ProSe UE-to-UE Relay.
　ProSe Service Info: the information about the ProSe identifier(s).
　RSC: the connectivity service provided by the 5G ProSe UE-to-UE Relay as requested by the source 5G ProSe End UE.
　Security Information: the information for the establishment of security for the second hop PC5 link establishment.

NOTE 2: The Security Information is defined by SA WG3.

The Direct Communication Accept message over the second hop PC5 reference point includes:
　User Info ID of target 5G ProSe End UE.

The Direct Communication Accept message over the first hop PC5 reference point includes:
　User Info ID of target 5G ProSe End UE.
　User Info ID of 5G ProSe UE-to-UE Relay.

The Link Modification Request message over the first hop PC5 reference point includes:
　User Info ID of target 5G ProSe End UE: the identity of the target 5G ProSe End UE provided to the source 5G ProSe End UE during UE-to-UE Relay Discovery procedure.
　(optional) Destination Layer-2 ID of target 5G ProSe End UE: the unicast destination Layer-2 ID of the target 5G ProSe End UE determined by the source 5G ProSe End UE as specified in clause 5.8.2.4.

The Link Modification Request message over the second hop PC5 reference point includes:
　User Info ID of source 5G ProSe End UE.
　User Info ID of target 5G ProSe End UE.

The Link Modification Accept message over the second hop PC5 reference point includes:
　User Info ID of target 5G ProSe End UE.

The Link Modification Accept message over the first hop PC5 reference point includes:
　User Info ID of target 5G ProSe End UE.

6.4.3.7.2 Layer-2 Link Management Over PC5 Reference Point for 5G ProSe Layer-2 UE-to-UE Relay For the 5G ProSe Communication via 5G ProSe Layer-2 UE-to-UE Relay as described in clause 6.7.2, the description in clause 6.4.3.7.1 applies.

The message contents over PC5 reference point for unicast mode 5G ProSe Direct Communication as depicted from clause 6.4.3.1 to clause 6.4.3.5 are same for the end-to-end connection between peer 5G ProSe End UEs.

[ . . . ]

6.7.2 5G ProSe Communication Via 5G ProSe Layer-2 UE-to-UE Relay

This procedure applies to 5G ProSe Layer-2 UE-to-UE Relay.

Figure 9:
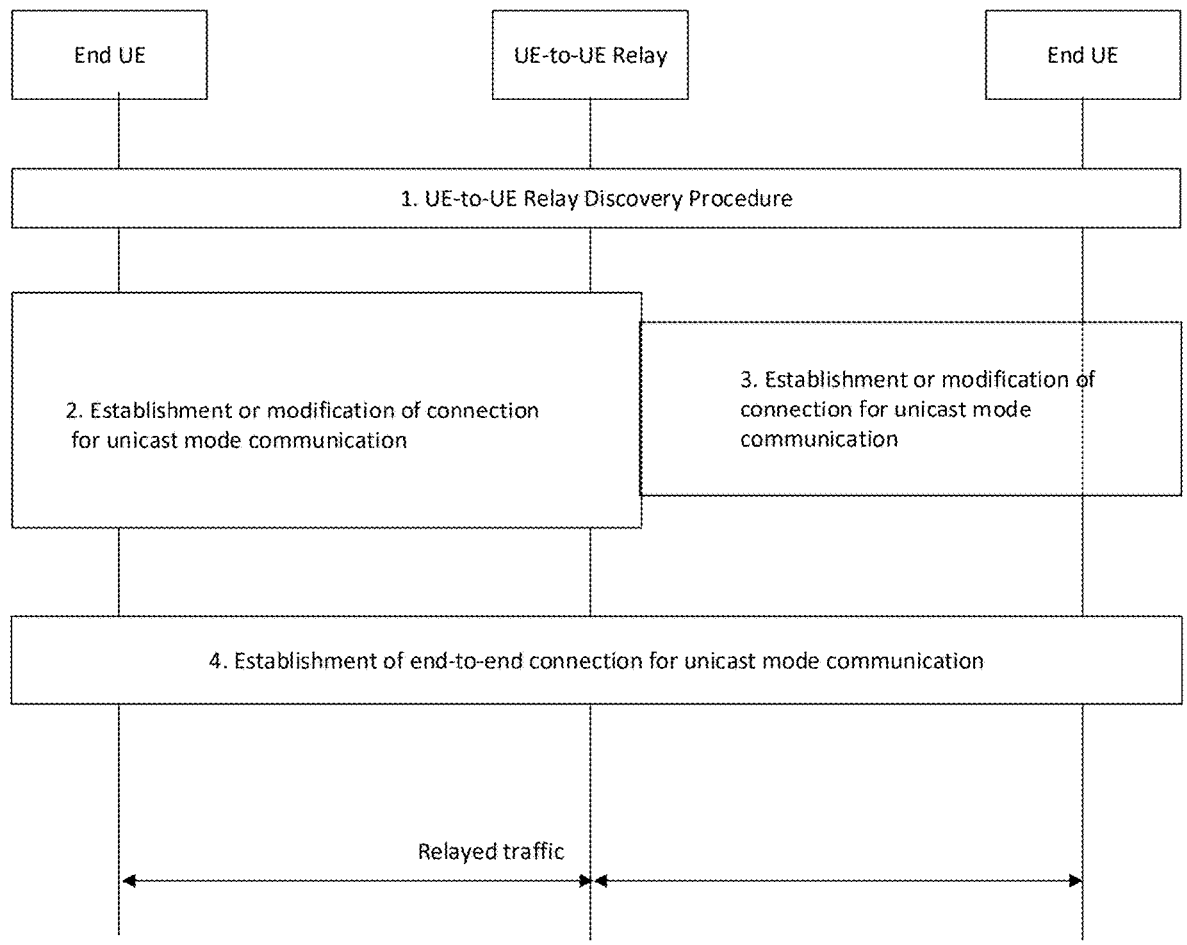
FIG. 9 is a reproduction of Figure 6.7.2-1 of 3GPP TS 23.304 V18.4.0.

[Figure 6.7.2-1 of 3GPP TS 23.304 V18.4.0, Entitled "5G ProSe Communication Via 5G ProSe Layer-2 UE-to-UE Relay", is Reproduced as FIG. 9]

Service authorization and provisioning has been performed for the 5G ProSe Layer-2 UE-to-UE Relay and the 5G ProSe End UEs as described in clause 6.2 before this procedure.

1. Model A or Model B 5G ProSe UE-to-UE Relay Discovery as described in clause 6.3.2.4 is performed and a source 5G ProSe End UE selects a suitable 5G ProSe Layer-2 UE-to-UE Relay for the communication with a target 5G ProSe End UE.
2. The source 5G ProSe End UE decides whether to use an existing PC5 link with the 5G ProSe UE-to-UE Relay for the required service. If an existing PC5 link is used then the Layer-2 link modification procedure as specified in clause 6.4.3.7 is used towards a 5G ProSe UE-to-UE Relay, otherwise a Layer-2 link establishment procedure is used towards a 5G ProSe UE-to-UE Relay.

This procedure is towards the selected 5G ProSe UE-to-UE Relay and for Layer-2 link establishment, the security establishment is performed before step 3 is initiated.
3. The 5G ProSe Layer-2 UE-to-UE Relay decides whether to use an existing PC5 link between the 5G ProSe UE-to-UE Relay and the target 5G ProSe End UE for the required service and initiates Layer-2 link establishment procedure or Layer-2 link modification procedure as specified in clause 6.4.3.7 with the target 5G ProSe End UE.

This procedure is performed towards the target 5G ProSe End UE using the unicast Layer-2 ID.

The 5G ProSe Layer-2 UE-to-UE Relay sends a Direct Communication Accept message or Link Modification Accept message to the the source 5G ProSe End UE after step 3 is completed.
4. The source 5G ProSe End UE establishes an end-to-end connection for unicast mode communication with the target 5G ProSe End UE as described in clause 6.4.3.7.

The data and End-to-End PC5-S signalling is transferred between the source 5G ProSe End UE and the target 5G ProSe End UE via the 5G ProSe Layer-2 UE-to-UE Relay. The 5G ProSe Layer-2 UE-to-UE Relay forwards all the data traffic and End-to-End PC5-S signalling between the source 5G ProSe End UE and the target 5G ProSe End UE, as specified in TS 38.300 [12].

3GPP TS 24.554 introduced the following concepts:

7.2 Unicast Mode 5G ProSe Direct Communication Over PC5

7.2.1 Overview

This clause describes the PC5 signalling protocol procedures between two UEs for one-to-one (i.e., unicast) mode of ProSe direct communication. The following PC5 signalling protocol procedures are defined:

a) 5G ProSe direct link establishment;
b) 5G ProSe direct link modification;
c) 5G ProSe direct link release;
d) 5G ProSe direct link identifier update;
e) 5G ProSe direct link keep-alive;
f) 5G ProSe direct link security mode control;
g) 5G ProSe direct link re-keying;
h) 5G ProSe direct link authentication;
i) 5G ProSe direct link UE-to-UE relay update; and
j) 5G ProSe direct link identification.

Each 5G ProSe direct link is associated with a 5G ProSe direct link context. For 5G ProSe UE-to-network relay, the 5G ProSe direct link context includes:

a) user info ID and layer-2 ID of 5G ProSe remote UE;
b) user info ID and layer-2 ID of 5G ProSe UE-to-network relay UE;
c) relay service code; and
d) in the case of 5G ProSe Layer-3 UE-to-network relay, the network layer protocol and the information about PC5 QoS flow(s).

For 5G ProSe UE-to-UE relay, the 5G ProSe direct link context includes:

a) user info ID and layer-2 ID of source 5G ProSe end UE;
b) user info ID and layer-2 ID of target 5G ProSe end UE;
b) user info ID and layer-2 ID of 5G ProSe UE-to-UE relay UE;
c) relay service code; and
d) in the case of 5G ProSe layer-3 UE-to-UE relay, the network layer protocol and the information about PC5 QoS flow(s), also the IP address(es) of the 5G ProSe end UE(s) at the 5G ProSe layer-3 UE-to-UE relay UE.

The 5G ProSe direct link context shall be created during a 5G ProSe direct link establishment procedure, be updated accordingly after a 5G ProSe direct link modification procedure or 5G ProSe direct link identifier update procedure and be deleted during the 5G ProSe direct link release procedure or during a local release of 5G ProSe direct link as specified in clause 7.2.

[ . . . ]

7.2.4 5G ProSe Direct Link Identifier Update Procedure 7.2.4.1 General

The 5G ProSe direct link identifier update procedure is used to update and exchange the new identifiers (e.g., application layer ID, layer-2 ID, security information and IP address/prefix) between two UEs for a 5G ProSe direct link before using the new identifiers. The UE sending the PROSE DIRECT LINK IDENTIFIER UPDATE REQUEST message is called the "initiating UE" and the other UE is called the "target UE".

7.2.4.2 5G ProSe Direct Link Identifier Update Procedure Initiation by Initiating UE The initiating UE shall initiate the procedure if:

a) the initiating UE receives a request from upper layers to change the application layer ID and there is an existing 5G ProSe direct link associated with this application layer ID; or
b) the privacy timer (see clause 5.2.4) of the initiating UE's layer-2 ID expires for an existing 5G ProSe direct link.

The initiating UE shall meet the following pre-conditions before initiating this procedure:

a) the timer T5091 is not running; and
b) the initiating UE is not performing the 5G ProSe direct link re-keying procedure initiated by the target UE.

If the 5G ProSe direct link identifier update procedure is triggered by a change of the initiating UE's application layer ID, the initiating UE shall create a PROSE DIRECT LINK IDENTIFIER UPDATE REQUEST message. In this message, the initiating UE:
- a) shall include the initiating UE's new application layer ID received from upper layer;
- b) shall include the initiating UE's new layer-2 ID assigned by itself;
- c) shall include the new MSB of $K_{NRP\text{-}sess}$ ID;
- d) shall include the new IP address/prefix if IP communication is used and the 5G ProSe direct link is not for 5G ProSe direct communication between 5G ProSe layer-2 remote UE and 5G ProSe layer-2 UE-to-network relay UE and the target UE is not a 5G ProSe layer-3 UE-to-UE relay UE;
- e) shall include the new IP address/prefix, if IP communication is used, IP address/prefix needs to be changed, the target UE is a 5G ProSe layer-3 UE-to-UE relay UE and IP address/prefix of the initiating UE is allocated by the initiating UE;
- f) shall include the IP address/prefix needed indication if IP communication is used, the target UE is a 5G ProSe layer-3 UE-to-UE relay UE, and IP address/prefix of the initiating UE needs to be changed and is allocated by the 5G ProSe UE-to-UE relay UE; and
- g) shall include the list of target end UE IP address/prefix (i.e. application layer ID(s) and IP address(es)/prefix (es)), if IP communication is used, the initiating UE's IP address/prefix needs to be changed, and the target UE is a 5G ProSe layer-3 UE-to-UE relay UE;

If the 5G ProSe direct link identifier update procedure is triggered by the expiry of the initiating UE's privacy timer T5090 as specified in clause 5.2.4 and clause 5.2.5, the initiating UE shall create a PROSE DIRECT LINK IDENTIFIER UPDATE REQUEST message. In this message, the initiating UE:
- a) shall include the initiating UE's new layer-2 ID assigned by itself;
- b) shall include the new MSB of $K_{NRP\text{-}sess}$ ID;
- c) may include the initiating UE's new application layer ID if received from upper layer;
- d) shall include the new IP address/prefix if IP communication is used and changed, and the 5G ProSe direct link is not for 5G ProSe direct communication between 5G ProSe layer-2 remote UE and 5G ProSe layer-2 UE-to-network relay UE and the target UE is not a 5G ProSe layer-3 UE-to-UE relay UE;
- e) shall include the new IP address/prefix if IP communication is used, IP address/prefix needs to be changed, the target UE is a 5G ProSe layer-3 UE-to-UE relay UE and IP address/prefix of the initiating UE is allocated by the initiating UE;
- f) shall include the IP address/prefix needed indication if IP communication is used, IP address/prefix shall be changed and the target UE is a 5G ProSe layer-3 UE-to-UE relay UE and IP address/prefix of the initiating UE is allocated by the 5G ProSe layer-3 UE-to-UE relay UE; and
- g) shall include the list of target end UE IP address/prefix (i.e. application layer ID and IP address/prefix) if IP communication is used, IP address/prefix shall be changed and the target UE is a 5G ProSe layer-3 UE-to-UE relay UE.

After the PROSE DIRECT LINK IDENTIFIER UPDATE REQUEST message is generated, the initiating UE shall pass this message to the lower layers for transmission along with the initiating UE's old layer-2 ID for 5G ProSe direct communication and the target UE's layer-2 ID for 5G ProSe direct communication and start timer T5082. The UE shall not send a new PROSE DIRECT LINK IDENTIFIER UPDATE REQUEST message to the same target UE while timer T5082 is running.

Figure 10:
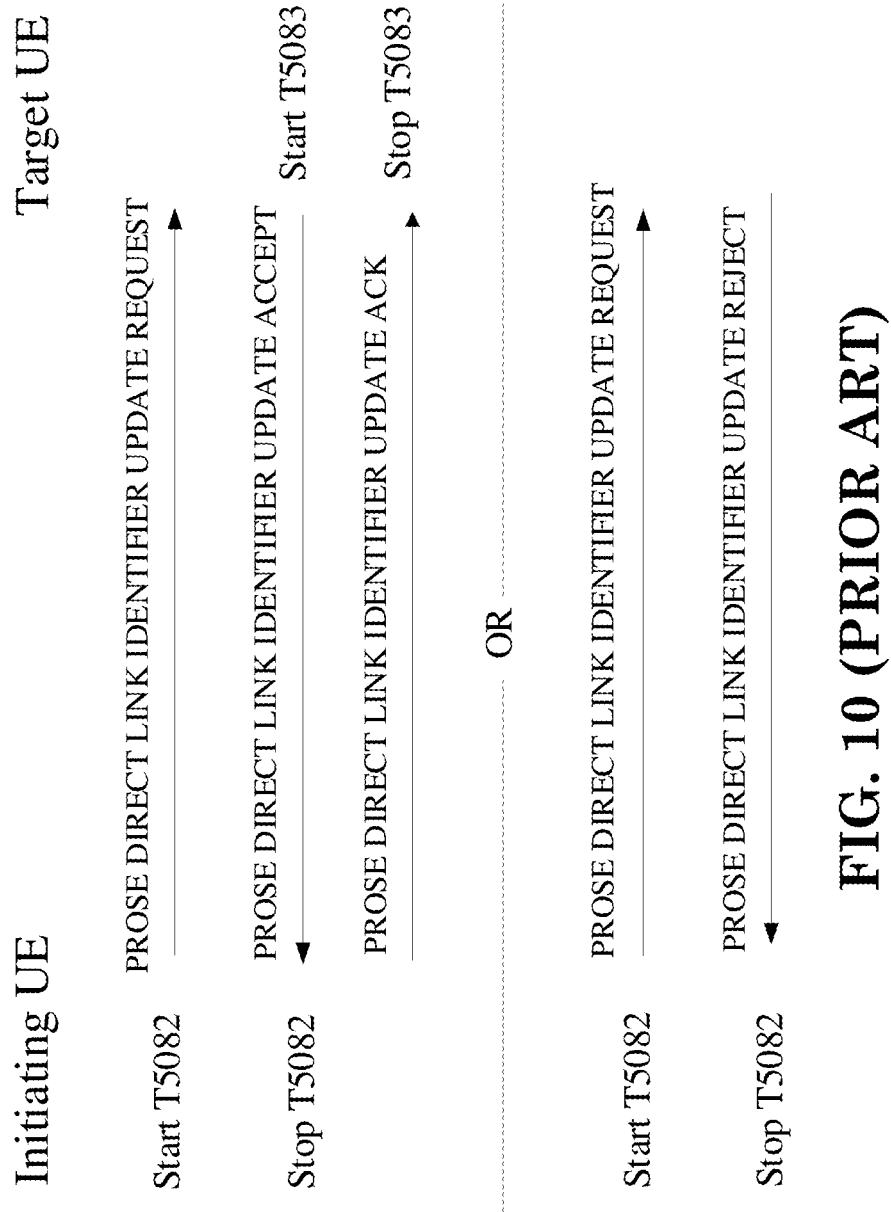
FIG. 10 is a reproduction of Figure 7.2.4.2.1 of 3GPP TS 24.554 V18.3.0.

[Figure 7.2.4.2.1 of 3GPP TS 24.554 V18.3.0, Entitled "5G ProSe Direct Link Identifier Update Procedure", is Reproduced as FIG. 10]

7.2.4.3 5G ProSe Direct Link Identifier Update Procedure Accepted by the Target UE Upon receipt of a PROSE DIRECT LINK IDENTIFIER UPDATE REQUEST message, if the target UE determines:
- a) the 5G ProSe direct link associated with this request message is still valid; and
- b) the timer T5083 for the 5G ProSe direct link identified by this request message is not running, then the target UE accepts this request and responds with a PROSE DIRECT LINK IDENTIFIER UPDATE ACCEPT message.

If the target UE is a 5G ProSe layer-3 UE-to-UE relay UE and IP address/prefix needed indication is received from the initiating UE, the 5G ProSe layer-3 UE-to-UE relay UE assigns a new IP address/prefix to the initiating UE.

If the target UE is a 5G ProSe layer-3 UE-to-UE relay UE, the 5G ProSe layer-3 UE-to-UE relay UE may initiate the 5G ProSe UE to UE relay update procedure as specified in clause 7.2.13.

The target UE shall create the PROSE DIRECT LINK IDENTIFIER UPDATE ACCEPT message. In this message, the target UE:
- a) shall include the target UE's new layer-2 ID assigned by itself;
- b) shall include the new LSB of $K_{NRP\text{-}sess}$ ID;
- c) shall include the initiating UE's new MSB of $K_{NRP\text{-}sess}$ ID;
- d) shall include the initiating UE's new layer-2 ID;
- e) shall include the target UE's new application layer ID if received from upper layer;
- f) shall include the initiating UE's new IP address/prefix if received from the initiating UE and IP communication is used or if IP address/prefix needed indication is received from the initiating UE and IP communication is used;
- g) shall include the initiating UE's new application layer ID if received from the initiating UE; and
- h) shall include the target UE's new IP address/prefix if IP communication is used and changed and the 5G ProSe direct link is not for 5G ProSe direct communication between 5G ProSe layer-2 remote UE and 5G ProSe layer-2 UE-to-network relay UE.

After the PROSE DIRECT LINK IDENTIFIER UPDATE ACCEPT message is generated, the target UE shall pass this message to the lower layers for transmission along with the initiating UE's old layer-2 ID for 5G ProSe direct communication and the target UE's old layer-2 ID for 5G ProSe direct communication and start timer T5083. The UE shall not send a new PROSE DIRECT LINK IDENTIFIER UPDATE ACCEPT message to the same initiating UE while timer T5083 is running. Before target UE receives the traffic using the new layer-2 IDs, the target UE shall continue to receive the traffic with the old layer-2 IDs (i.e., initiating UE's old layer-2 ID and target UE's old layer-2 ID) from initiating UE.

Before target UE receives the PROSE DIRECT LINK IDENTIFIER UPDATE ACK message from initiating UE, the target UE shall keep sending traffic to the initiating UE using the old layer-2 IDs (i.e., initiating UE's old layer-2 ID for 5G ProSe direct communication and target UE's old layer-2 ID for 5G ProSe direct communication).

7.2.4.4 5G ProSe Direct Link Identifier Update Procedure Acknowledged by the Initiating UE Upon receipt of the PROSE DIRECT LINK IDENTIFIER UPDATE ACCEPT message, the initiating UE shall save its new IP address/prefix if received on the PROSE DIRECT LINK IDENTIFIER UPDATE ACCEPT message, shall stop timer T5082 and respond with a PROSE DIRECT LINK IDENTIFIER UPDATE ACK message. In this message, the initiating UE:

a) shall include the target UE's new layer-2 ID;
b) shall include the target UE's new LSB of $K_{NRP-sess}$ ID;
c) shall include the target UE's new application layer ID, if received;
d) shall include the target UE's new IP address/prefix, if received; and
e) shall include the initiating UE's new IP address/prefix, if received on the PROSE DIRECT LINK IDENTIFIER UPDATE ACCEPT message.

After the PROSE DIRECT LINK IDENTIFIER UPDATE ACK message is generated, the initiating UE shall pass this message to the lower layers for transmission along with the initiating UE's old layer-2 ID for 5G ProSe direct communication and the target UE's old layer-2 ID for 5G ProSe direct communication and shall stop timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5.

Upon sending the PROSE DIRECT LINK IDENTIFIER UPDATE ACK message, the initiating UE shall update the associated 5G ProSe direct link context with the new identifiers and pass the new layer-2 IDs (i.e., initiating UE's new layer-2 ID for 5G ProSe direct communication and target UE's new layer-2 ID for 5G ProSe direct communication) along with the PC5 link identifier down to the lower layer. Then the initiating UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data. The initiating UE shall continue to receive traffic with the old layer-2 IDs (i.e., initiating UE's old layer-2 ID for 5G ProSe direct communication and target UE's old layer-2 ID for 5G ProSe direct communication) from the target UE until it receives traffic with the new layer-2 IDs (i.e., initiating UE's new layer-2 ID and target UE's new layer-2 ID) from the target UE.

7.2.4.5 5G ProSe Direct Link Identifier Update Procedure Completion by the Target UE Upon receipt of the PROSE DIRECT LINK IDENTIFIER UPDATE ACK message, the target UE shall update the associated 5G ProSe direct link context with the new identifiers, pass the new layer-2 IDs (i.e., initiating UE's new layer-2 ID and target UE's new layer-2 ID) down to the lower layer, stop timer T5083 and timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. Then the target UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

[ . . . ]

Figure 14:
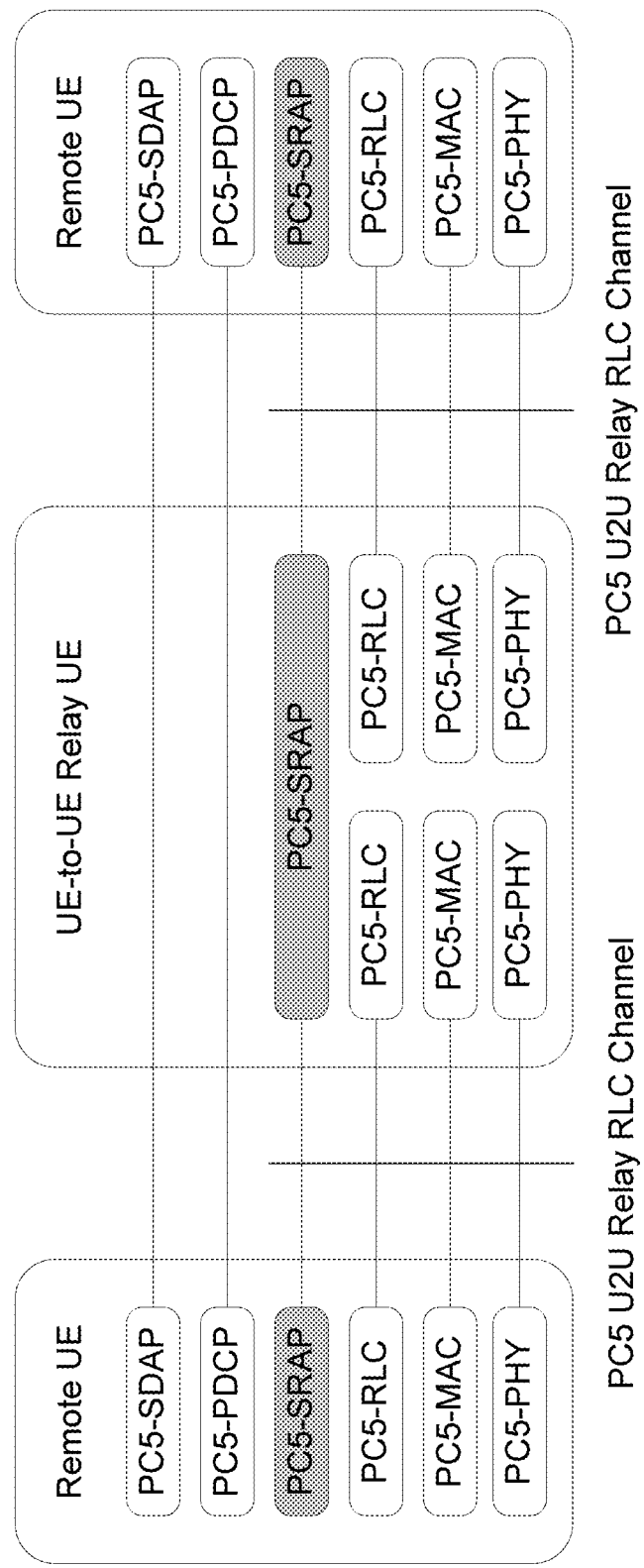
FIG. 14 is a reproduction of Figure 16.12.2.2-1 of 3GPP TS 38.300 V18.0.0.
Figure 15:
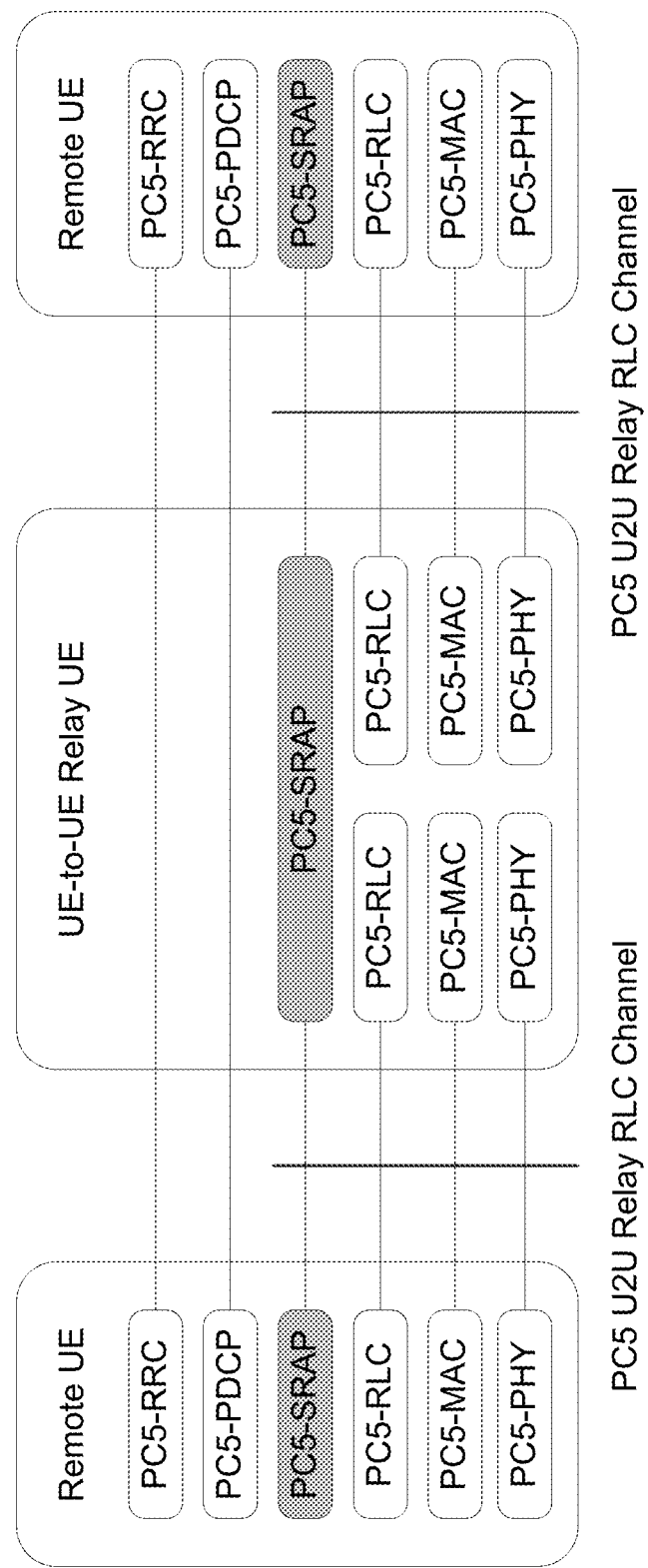
FIG. 15 is a reproduction of Figure 16.12.2.2-2 of 3GPP TS 38.330 V18.0.0.
Figure 16:
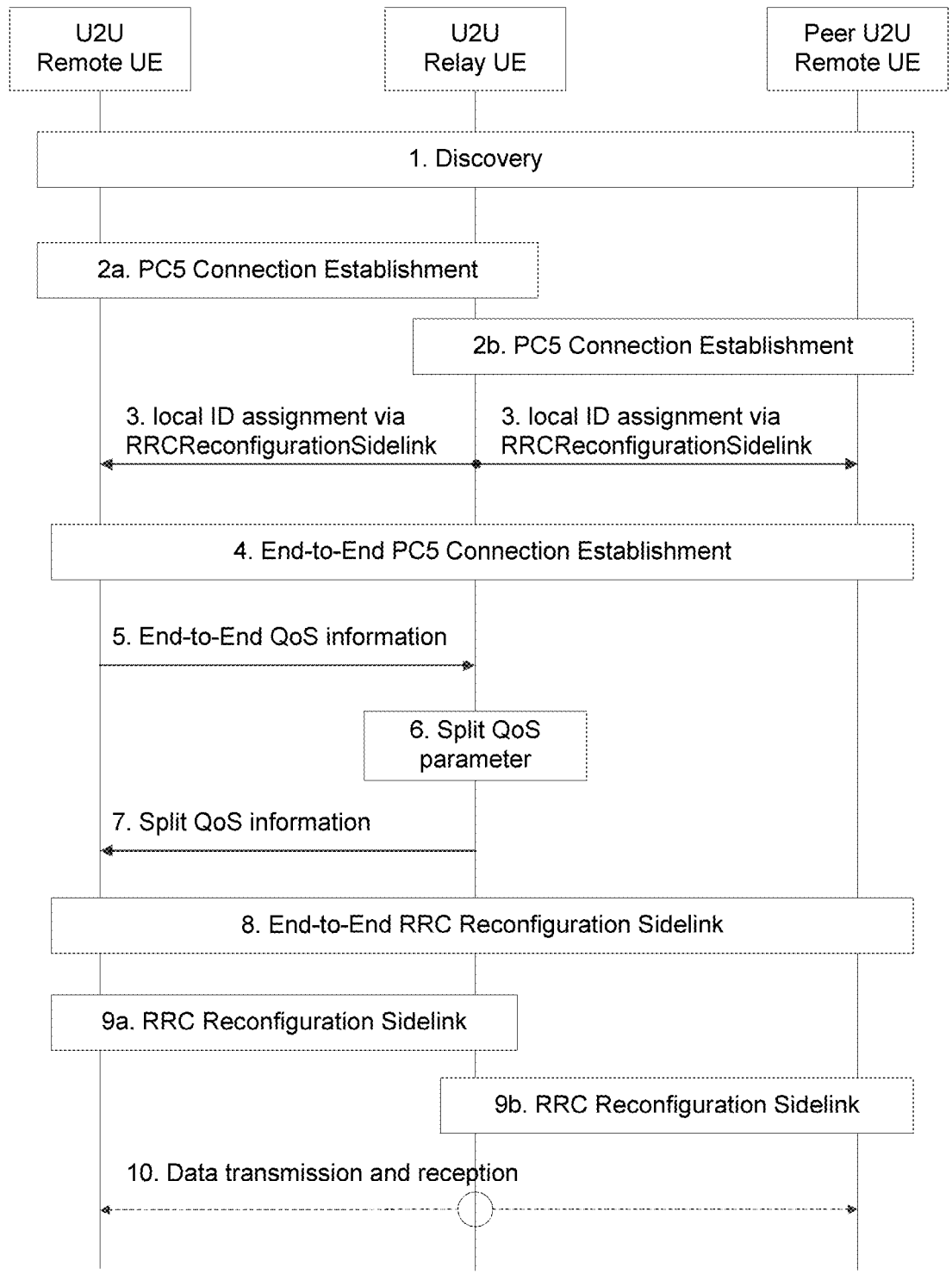
FIG. 16 is a reproduction of Figure 16.12.7-1 of 3GPP TS 38.300 V18.0.0.

10.3.18 ProSe Direct Link Identifier Update Request
10.3.18.1 Message Definition
This message is sent by a UE to another peer UE to initiate the direct link identifier update procedure. See table 10.3.18.1.1.
  Message type: PROSE DIRECT LINK IDENTIFIER UPDATE REQUEST
  Significance: dual
  Direction: UE to peer UE
[Table 10.3.18.1.1 of 3GPP TS 24.554 V18.3.0, Entitled "PROSE DIRECT LINK IDENTIFIER UPDATE REQUEST Message Content", is Reproduced as FIG. 11]
[ . . . ]
10.3.19 ProSe Direct Link Identifier Update Accept
10.3.19.1 Message Definition
This message is sent by the UE to another peer UE to indicate that the link identifier update request is accepted. See table 10.3.19.1.1.
  Message type: PROSE DIRECT LINK IDENTIFIER UPDATE ACCEPT
  Significance: dual
  Direction: UE to peer UE
[Table 10.3.19.1.1 of 3GPP TS 24.554 V18.3.0, Entitled "PROSE DIRECT LINK IDENTIFIER UPDATE ACCEPT Message Content", is Reproduced as FIG. 12]
[ . . . ]
10.3.20 ProSe Direct Link Identifier Update Ack
10.3.20.1 Message Definition
This message is sent by the initiating UE to target UE to indicate that the initiating UE has received target UE's accept message. See table 10.3.20.1.1.
  Message type: PROSE DIRECT LINK IDENTIFIER UPDATE ACK
  Significance: dual
  Direction: UE to peer UE
[Table 10.3.20.1.1 of 3GPP TS 24.554 V18.3.0, Entitled "PROSE DIRECT LINK IDENTIFIER UPDATE ACK Message Content", is Reproduced as FIG. 13] 3GPP TS 38.300 specifies Sidelink-based UE-to-UE relay as follows:
16.12.2.2 L2 UE-to-UE Relay
The protocol stacks for the user plane and the control plane of the L2 U2U Relay architecture are illustrated in Figure 16.12.2.2-1 and Figure 16.12.2.2-2. The SRAP sublayer is placed above the RLC sublayer for both CP and UP at both PC5 interfaces. The sidelink SDAP, PDCP and RRC are terminated between two L2 U2U Remote UEs (i.e., end-to-end), while SRAP, RLC, MAC and PHY are terminated in each hop of PC5 link.
[Figure 16.12.2.2-1 of 3GPP TS 38.300 V18.0.0, Entitled "User Plane Protocol Stack for L2 UE-to-UE Relay", is Reproduced as FIG. 14]
[Figure 16.12.2.2-2 of 3GPP TS 38.330 V18.0.0, Entitled "Control Plane Protocol Stack for L2 UE-to-UE Relay", is Reproduced as FIG. 15]
For L2 UE-to-UE Relay, the SRAP sublayer at L2 U2U Remote UE:
  The SRAP sublayer at L2 U2U Remote UE performs bearer mapping between end-to-end PC5 Radio Bearers (SL-SRBs or SL-DRBs) of the L2 U2U Remote UE and at each hop of PC5 Relay RLC Channel between the L2 U2U Remote UE and the L2 U2U Relay UE.
  For the traffic transmitted from an L2 U2U Remote UE to an L2 U2U Relay UE, the different end-to-end PC5 Radio Bearers (SL-SRBs or SL-DRBs) towards the same peer L2 U2U Remote UE and/or different peer L2 U2U Remote UEs can be multiplexed to the same PC5 Relay RLC channel, which is between the L2 U2U Remote UE(s) and the L2 U2U Relay UE.

For the traffic received at L2 U2U Remote UE, the same PC5 Relay RLC channel from one L2 U2U Relay UE can be de-multiplexed to the different end-to-end PC5 Radio Bearers (SL-SRBs or SL-DRBs) of the same peer L2 U2U Remote UE and/or different peer L2 U2U Remote UEs.

The SRAP sublayer at L2 U2U Remote UE supports identification of the peer L2 U2U Remote UE and itself. The local IDs are assigned by L2 U2U Relay UE to both L2 U2U Remote UEs for identification. For the two local IDs, one of them identifies L2 U2U Remote UE and the other identifies the peer L2 U2U Remote UE. The local ID of the peer L2 U2U Remote UE and the local ID of L2 U2U Remote UE are delivered by L2 U2U Relay UE to the L2 U2U Remote UEs along with the corresponding L2 ID of the peer L2 U2U Remote UE. The identity information of the end-to-end PC5 Radio Bearer and two local IDs are included in the SRAP header in order for the peer L2 U2U Remote UE to correlate the received packets for the specific PDCP entity associated with the right end-to-end PC5 Radio Bearer of the L2 U2U Remote UEs.

For L2 UE-to-UE Relay, the SRAP sublayer at L2 U2U Relay UE:

The SRAP sublayer at L2 U2U Relay UE determines the egress PC5 Relay RLC Channel based on the mapping of the end-to-end PC5 Radio Bearer and egress PC5 Relay RLC Channel for a particular pair between the L2 U2U Remote UE and the peer L2 U2U Remote UE.

For the ingress traffic received from an/multiple L2 U2U Remote UE(s) at L2 U2U Relay UE, the different end-to-end PC5 Radio Bearers (SL-SRBs or SL-DRBs) of the same L2 U2U Remote UE and/or the same/different end-to-end PC5 Radio Bearers (SL-SRBs or SL-DRBs) of L2 U2U Remote UEs can be multiplexed to the same egress PC5 Relay RLC channel, which is in between the L2 U2U Relay UE and the peer L2 U2U Remote UE.

[ . . . ]

16.12.7 Control Plane Procedures for L2 U2U Relay

The L2 U2U Remote UE needs to establish end-to-end SL-SRB/DRBs with the peer L2 U2U Remote UE before user plane data transmission.

The following high level connection establishment procedure in Figure 16.12.7-1 applies to a L2 U2U Relay UE and L2 U2U Remote UE:

[Figure 16.12.7-1 of 3GPP TS 38.300 V18.0.0, Entitled "Procedure for L2 U2U Remote UE Connection Establishment", is Reproduced as FIG. 16]

1. The L2 U2U Remote UE, L2 U2U Relay UE, and peer L2 U2U Remote UE perform discovery procedure or integrated discovery procedure.
2a. The L2 U2U Remote UE establishes/modifies a PC5-RRC connection with the selected L2 U2U Relay UE (i.e., as specified in TS 23.304 [48]).
2b. The L2 U2U Relay UE establishes/modifies a PC5-RRC connection with the peer L2 U2U Remote UE (i.e., as specified in TS 23.304 [48]).
3. The L2 U2U Relay UE allocates two local IDs and it is delivered via RRCReconfigurationSidelink message to each of the L2 U2U Remote UEs: one local ID to identify the L2 U2U Remote UE, the other local ID to identify the peer L2 U2U Remote UE. When the local ID is delivered, an L2 ID of the peer L2 U2U Remote UE is also delivered to the U2U Remote UE for making the association between the local ID and the L2 ID of the peer U2U Remote UE.
4. The L2 U2U Remote UE establishes end-to-end PC5-RRC connection with the peer L2 U2U Remote UE via the L2 U2U Relay UE. For the end-to-end connection establishment, fixed indexes (i.e., 0/1/2/3) are defined for end-to-end SL-SRB 0/1/2/3 respectively, and specified PC5 Relay RLC Channel configuration is used on each hop. The sidelink UE capability is exchanged between the L2 U2U Remote UEs via PC5-RRC (e.g., SL-SRB3) message.
5. The L2 U2U Remote UE sends to the L2 U2U Relay UE all the QoS profiles for the end-to-end QoS flows via PC5-RRC.
6. The L2 U2U Relay UE performs QoS split only for PDB.
NOTE: It is up to L2 U2U Relay UE implementation on how to split PDB.
7. The L2 U2U Relay UE sends the split QoS value (i.e., PDB) via PC5-RRC message to the L2 U2U Remote UE.
8. The L2 U2U Remote UE or the serving gNB of the L2 U2U Remote UE derives the PDCP and SDAP configuration for end-to-end SL-DRB and provides the portion of the configuration related to reception to the peer L2 U2U Remote UE using end-to-end RRCReconfigurationSidelink messages. The end-to-end bearer IDs for SL-SRB and SL-DRB are used as input for the L2 U2U Relay ciphering and deciphering at PDCP.
9a. The L2 U2U Remote UE or the serving gNB of the L2 U2U Remote UE derives the first hop configuration (e.g. PC5 Relay RLC Channel configuration) for SL-DRB and provides to the L2 U2U Relay UE of the configuration related to receiving on the first hop (i.e., Rx by the relay UE), using per-hop RRCReconfigurationSidelink message.
9b. The L2 U2U Relay UE or the serving gNB of the L2 U2U Relay UE derives the second hop configuration (e.g. PC5 Relay RLC Channel configuration) for each SL-DRB and provides to the peer L2 U2U Remote UE of the configuration related to receiving data packets on the second hop (i.e., RX by the peer remote UE), using per-hop RRCReconfigurationSidelink message.
10. The L2 U2U Remote UE and the peer L2 U2U Remote UE transmit or receive data via L2 U2U Relay UE.

The 3GPP RAN2 #125 meeting made the following agreements on U2U Relay (as captured in the 3GPP RAN2 #125 meeting chairman notes):

There are no concurrent PC5 connection setup procedures between a single source remote UE and different target remote UEs via the same relay UE. RAN2 will not capture this in a spec and it is left to SA2 to decide if there is something to capture.

Before receiving Layer-2 ID from AS layer, source Remote UE does not trigger PC5 connection setup procedure towards another target Remote UE via the same relay UE.

During Local ID assignment, Relay UE indicates to the source Remote UE layer-2 ID of the target Remote UE ID in RRCReconfigurationSidelink.

Source Remote UE indicates layer-2 ID of the target Remote UE to ProSe layer.

Source Remote UE AS layer maintains Layer-2 ID and local ID mapping per relay UE.

LS to SA2 and CT1 to indicate our agreements.

3GPP TS23.304 describes support of UE-to-UE Relay in the following release (i.e. Release 18), which means a relay UE may be used to support communication between two Proximity-based Services (ProSe) End UEs in case these two UEs cannot communicate with each other directly. A UE-to-UE Relay UE establishes one PC5 unicast link (on first PC5 hop) with a Source end UE and one PC5 unicast link (on second PC5 hop) with a Target end UE for forwarding traffic of the concerned ProSe service(s) between the two ProSe End UEs.

3GPP TS 24.554 describes that each UE (i.e. source 5G ProSe end UE, target 5G ProSe end UE, 5G ProSe UE-to-UE relay UE) maintains a direct link context for supporting UE-to-UE relay communication between the source 5G ProSe end UE and the target 5G ProSe end UE via the 5G ProSe UE-to-UE relay UE, as quoted below.

For 5G ProSe UE-to-UE relay, the 5G ProSe direct link context includes:
  a) user info ID and layer-2 ID of source 5G ProSe end UE;
  b) user info ID and layer-2 ID of target 5G ProSe end UE;
  b) user info ID and layer-2 ID of 5G ProSe UE-to-UE relay UE;

It supposes that Rel-18 L2 U2U Relay follows the legacy Sidelink (SL) concept (i.e. providing Layer-2 ID information to AS layer) that would enable the AS layer to select corresponding local IDs to be included in Sidelink Relay Adaptation Protocol (SRAP) header. Thus, the AS layer of the source end UE requires the Layer-2 ID of the source end UE (as source) and the Layer-2 ID of the L2 U2U Relay UE (as destination) for transmission on the 1st-hop. In order to support using the ID mappable to the target end UE in the SRAP header on the 1st hop, the AS layer of the source end UE also requires the Layer-2 ID of the target end UE. In addition, since the ID mappable to the source end UE is needed in the SRAP header on 2nd hop for the target end UE to identify which source end UE sending the sidelink packet, the AS layer of the target end UE also requires the Layer-2 ID of the source end UE.

Figure 17:
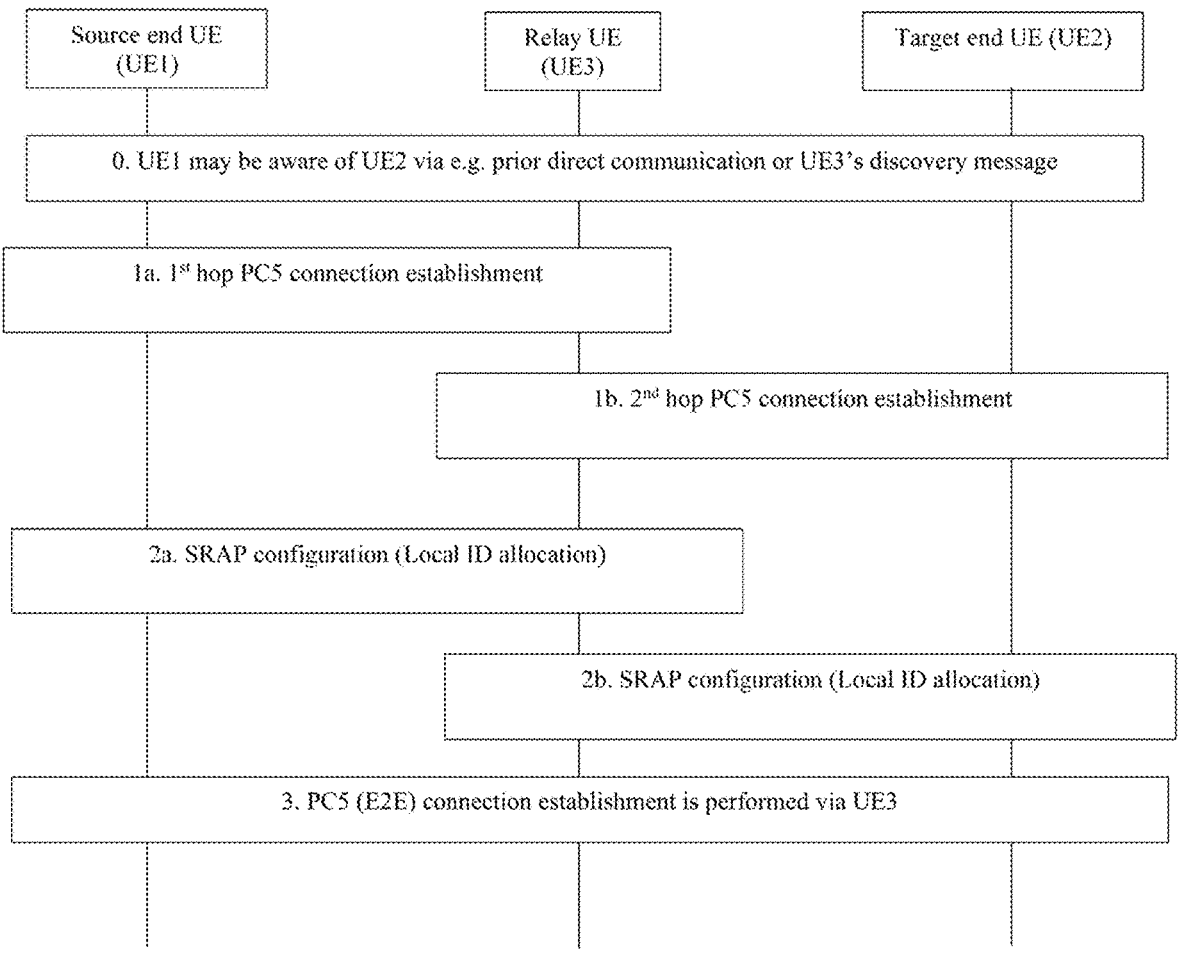
FIG. 17 is a message flow chart of PC5 connection establishment for U2U relay communication according to one exemplary embodiment.

There could be a U2U relay communication between a source end UE (i.e. UE1) and a destination end UE (i.e. UE2) via a U2U relay UE (i.e. UE3). In FIG. 17, an example of step flow could be illustrated for connection setup for U2U relay communication based on 3GPP TS 23.304, TS 24.554, and TS 38.300, and 3GPP RAN2 #125 meeting chairman notes. Details of each step could be described below.

0. UE1 may be aware of UE2's upper layer identity (i.e. application layer identity) beforehand. It would be known to UE1 due to prior direct communication between UE1 and UE2. It would be known to UE1 due to content of relay discovery message received from UE3.

1a, 1b. UE1 may establish a first hop PC5 connection with UE3. The method of establishing the first hop PC5 connection could be based on the method as introduced in (Step 2 of) Figure 6.7.2-1 (reproduced as FIG. 9) and related statements in 3GPP TS 23.304 V18.4.0.

UE2 may establish a second hop PC5 connection with UE3. The method of establishing the second hop PC5 connection could be based on the method as introduced in (Step 3 of) Figure 6.7.2-1 (reproduced as FIG. 9) and related statements in 3GPP TS 23.304 V18.4.0.

In the following sidelink transfer between UE1 and UE3 on the first hop PC5 connection, a L2ID1 of UE1 and a L2ID3 of UE3 may be used. In the following sidelink transfer between UE2 and UE3 on the second hop PC5 connection, a L2ID2 of UE2 and a L2ID4 of UE3 may be used. It is also possible that the L2ID3 of UE3 could be the same as the L2ID4 of UE3.

2a,2b. For usage in SRAP layer, a Local ID1 could be associated with the L2ID1 of UE1 when the Local ID1 is assigned to UE1, and a Local ID2 could be associated with the L2ID2 of UE2 when the Local ID2 is assigned to UE2.

The Local ID1 could be assigned by UE3 and then informed to UE1 via PC5 signalling. The Local ID2 could be assigned by UE3 and then informed to UE2 via PC5 signalling. The Local ID1 (and the L2ID1 of UE1) could be informed to UE2 (by UE3) via PC5 signalling. The Local ID2 (and the L2ID2 of UE2) could be informed to UE1 (by UE3) via PC5 signalling.

The Local ID2 could be included in a header of a SRAP packet sent from UE1 to UE3 so that UE3 can address this SRAP packet to UE2 based on the Local ID2. The Local ID1 could be included in a header of a SRAP packet sent from UE3 to UE2 so that UE2 can know this SRAP packet comes from UE1 based on the Local ID1.

The Local ID1 may be the same as the Local ID2.

The PC5 signalling may be AS signalling (e.g. PC5-RRC message). According to the 3GPP RAN2 #125 meeting chairman notes, the L2ID1 of UE1 may be delivered from AS layer of UE1 to ProSe layer of UE1. Similarly, the L2ID2 of UE2 may be delivered from AS layer of UE2 to ProSe layer of UE2.

3. UE1 and UE2 could establish an end-to-end (E2E) connection via UE3. The method of establishing the E2E connection could be based on the method as introduced in (Step 4 of) Figure 6.7.2-1 (reproduced as FIG. 9) and related statements in 3GPP TS 23.304 V18.4.0. The signalling used for establishing the E2E PC5 connection could be sent with the Local ID1 and the Local ID2 as mentioned above.

UE1 may establish/create a first direct link context associated with the U2U relay communication between UE1 and UE2 via the relay UE. The first direct link context could include the L2ID1 of UE1, the L2ID2 of UE2, the L2ID3 of UE3, and/or etc.

UE2 may establish/create a second direct link context associated with the U2U relay communication between UE1 and UE2 via the relay UE. The second direct link context could include the L2ID1 of UE1, the L2ID2 of UE2, the L2ID4 of UE3, and/or etc.

UE3 may establish/create a third direct link context associated with the U2U relay communication between UE1 and UE2 via the relay UE. The third direct link context could include the L2ID1 of UE1, the L2ID2 of UE2 and/or etc. The third direct link context could also include the L2ID3 of UE3 and/or the L2ID4 of UE3. Alternatively, UE3 may establish/create a third direct link context associated with the first hop PC5 connection and a fourth direct link context associated with the second hop PC5 connection. The third direct link context could include the L2ID1 of UE1, the L2ID2 of UE2, the L2ID3 of UE3 and/or etc., and the fourth direct link context could include the L2ID1 of UE1, the L2ID2 of UE2, the L2ID4 of UE3 and/or etc.

According to 3GPP 24.554, the 5G ProSe direct link identifier update procedure may be triggered by update of application layer Identifier/Identity (ID). If Line Identifier Update (LIU) procedure is triggered by update of application layer ID, the corresponding Layer 2 Identifier (L2ID) is also changed. The LIU procedure depicted in clause 6.4.3.2 in 3GPP TS 23.304 could be applied for L2 UE-to-UE (U2U) relay communication. Thus, the source end UE may perform a per-hop LIU procedure with the relay UE. The per-hop LIU procedure could be performed for updating (e.g. the source end UE's application layer ID), the relay UE's application layer ID, the source end UE's L2ID and the relay UE's L2ID.

It is noted that the source end UE's L2ID and the relay UE's L2ID are used for sidelink communication between the source end UE and the relay UE on the first hop. Besides, the source end UE may perform an end-to-end (E2E) LIU procedure with the target end UE via the relay UE. The E2E LIU procedure triggered by update of application layer ID could be used for updating (e.g. the source end UE's application layer ID and the target end UE's application layer ID). According to 3GPP TS 24.554, the Source layer-2 ID IE field is mandatory in LIU signalling. Thus, the source end UE would also set a its new L2 ID in the E2E LIU request message, and the target end UE would also set a its new L2 ID in the E2E LIU response message.

Currently, it is not clear which one of per-hop LIU procedure and E2E LIU procedure should be performed first. The details on operating LIU procedure for L2 U2U relay communication could be considered below.

The source end UE may firstly perform the per-hop LIU procedure and then perform the E2E LIU procedure. To achieve this, the E2E LIU procedure would be triggered by (end/completion of or reception or transmission of a message of) the per-hop LIU procedure. The per-hop LIU procedure (between UE1 and UE3) may be initiated by UE1 or UE3. UE1 may then initiate an E2E link identifier update procedure with UE2 (in response to end/completion the per-hop LIU procedure, reception of a first LIU request message of the per-hop LIU procedure, reception of a first LIU response message of the per-hop LIU procedure, reception of a first LIU Acknowledgement (ACK) message of the per-hop LIU procedure, or transmission of the first LIU ACK message of the per-hop LIU procedure).

Since the source end UE may maintain one direct link context associated with the U2U relay communication between the source end UE and the target end UE via the relay UE, this direct link context may be updated based on such per-hop LIU procedure and E2E LIU procedure. Thus, if the source end UE firstly performs the per-hop LIU procedure with the relay UE and then performs the E2E LIU procedure with the target end UE via the relay UE, the direct link context of the source end UE would be updated based on the result of the per-hop LIU procedure and then updated based on the result of the E2E LIU procedure.

However, from the relay UE perspective, the direct link context of the relay UE was updated based on the per-hop LIU procedure. If this is the case, the source end UE's L2ID in the direct link context of the source end UE would be different from the source end UE's L2ID the direct link context of the relay UE. In this situation, it would cause sidelink communication problem since the source end UE would use its new L2ID in the direct link context updated based on the E2E LIU procedure but the relay UE would use the new L2ID of the source end UE in the direct link context updated based on the per-hop LIU procedure.

For example, following above examples, UE1 would perform a per-hop LIU procedure with UE3 for updating the L2ID1 of UE1 to a new L2ID1a of UE1 and then perform an E2E LIU procedure with UE2 via UE3 for updating the L2ID1a of UE1 to a new L2ID1b of UE1. UE3 would not know UE1 has updated the L2ID1a of UE1 to the L2ID1b of UE1. To this end, the U2U relay communication would be exceptionally released. To address the issue, after the E2E LIU procedure is finished, the source end UE would need to perform another per-hop LIU procedure with the relay UE again (in order for aligning its L2 ID with the relay UE). For example, UE1 would perform a second per-hop LIU procedure with UE3 for updating the L2ID1b of UE1 to a new L2ID1c of UE1. However, it would cause signalling overhead and latency.

Figure 18:
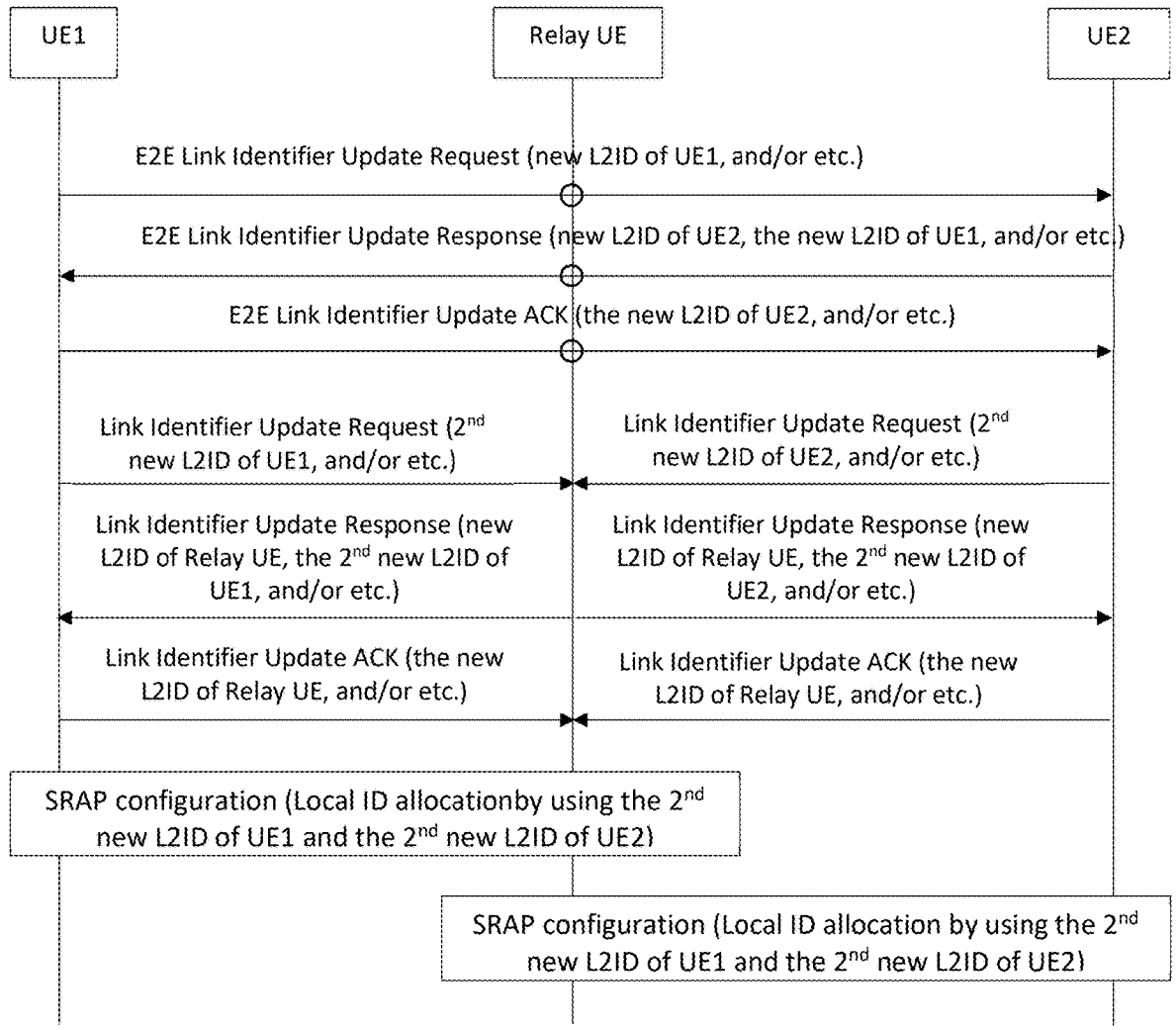
FIG. 18 is a message flow chart according to one exemplary embodiment.

Thus, alternatively, it would be proposed that the source end UE firstly performs the E2E LIU procedure and then performs the per-hop LIU procedure. To achieve this, the per-hop LIU procedure would be triggered by (end/completion of or reception or transmission of a message of) the E2E LIU procedure. The concept of this solution could be illustrated in FIG. 18. UE1 may send a E2E LIU request message including a new L2ID (i.e. a new L2ID1) of UE1 to UE2. UE2 may respond a E2E LIU response message including a new L2ID (i.e. a new L2ID2) of UE2 to UE1. UE1 may then acknowledge a E2E LIU ACK message including the new L2ID (i.e. the new L2ID2) of UE2 to UE2. UE1 may then initiate a first (per-hop) link identifier update procedure with UE3 (in response to end/completion the E2E LIU procedure, reception of the E2E LIU response message, or transmission of the E2E LIU ACK message). UE1 may send a first LIU request message including a second new L2ID (i.e. a second new L2ID1) of UE1 to UE3. And then, UE3 may respond a first LIU response message including a new L2ID (i.e. a new L2ID3) of UE3 to UE1. UE1 may then acknowledge a first LIU ACK message including the new L2ID (i.e. the new L2ID3) of UE3 to UE3.

The above concepts in UE1 may be also applied for UE2. UE2 may initiate a second (per-hop) link identifier update procedure with UE3 (that may be triggered by end/completion of the E2E LIU procedure, reception or transmission of a message of the E2E LIU procedure, or accepting the E2E LIU procedure). UE2 may send a second LIU request message including a second new L2ID (e.g. a second new L2ID2) of UE2 to UE3. UE3 may respond a second LIU response message including a new L2ID (i.e. a new L2ID4) of UE3 to UE2. UE2 may then acknowledge a second LIU ACK message including the new L2ID (i.e. the new L2ID4) of UE3 to UE3. It is also possible that the new L2ID3 of UE3 could be the same as the new L2ID4 of UE3.

Based on this consideration, the relay UE may need to send new L2ID-to-local ID mapping to each end UE. The new L2ID-to-local ID mapping may be used for associating the current local ID (or a new local ID) for the peer end UE with the latest new L2ID (e.g. the second new L2ID1 or the second new L2ID2) of the peer end UE. The new L2ID-to-local ID mapping may be also used for associating current local ID (or a new local ID) for this end UE with the latest new L2ID of this end UE. And then, each end UE may inform ProSe layer about the peer end UE's latest new L2ID and thus to update the associated direct link context with the peer end UE's latest new L2ID.

Here is an example of text proposal for realizing the concept of above solution.

7.2.4.2 5G ProSe Direct Link Identifier Update Procedure Initiation by Initiating UE The initiating UE shall initiate the procedure if:
a) the initiating UE receives a request from upper layers to change the application layer ID and, there is an existing 5G ProSe direct link associated with this application layer ID in case the initiating UE is not acting as the source 5G ProSe layer-2 end UE for this 5G ProSe direct link or there is an existing end-to-end connection associated with this application layer ID in case the initiating UE is acting as the source 5G ProSe end UE;
b) the privacy timer (see clause 5.2.4) of the initiating UE-s layer-2 ID expires for an existing 5G ProSe direct link; or
c) the 5G ProSe direct link identifier update procedure initiated between the initiating UE acting as the source 5G ProSe end UE and the target 5G ProSe end UE via the 5G ProSe UE-to-UE relay UE is completed successfully.

Here is an example of text proposal related to the source end UE with above solution.

7.2.4.4 5G ProSe direct link identifier update procedure acknowledged by the initiating UE Upon receipt of the PROSE DIRECT LINK IDENTIFIER UPDATE ACCEPT message, the initiating UE shall save its new IP address/prefix if received on the PROSE DIRECT LINK IDENTIFIER UPDATE ACCEPT message, shall stop timer T5082 and respond with a PROSE DIRECT LINK IDENTIFIER UPDATE ACK message. In this message, the initiating UE:
a) shall include the target UE's new layer-2 ID;
b) shall include the target UE's new LSB of $K_{NRP-sess}$ ID;
c) shall include the target UE's new application layer ID, if received;
d) shall include the target UE's new IP address/prefix, if received; and
e) shall include the initiating UE's new IP address/prefix, if received on the PROSE DIRECT LINK IDENTIFIER UPDATE ACCEPT message.

After the PROSE DIRECT LINK IDENTIFIER UPDATE ACK message is generated, the initiating UE shall pass this message to the lower layers for transmission along with the initiating UE's old layer-2 ID for 5G ProSe direct communication and the target UE's old layer-2 ID for 5G ProSe direct communication and shall stop timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. If the 5G ProSe direct link identifier update procedure is initiated between the initiating UE acting as the source 5G ProSe end UE and the target 5G ProSe end UE via the 5G ProSe UE-to-UE relay UE, the initiating UE shall initiate a 5G ProSe direct link identifier update procedure with the 5G ProSe UE-to-UE relay UE.

Upon sending the PROSE DIRECT LINK IDENTIFIER UPDATE ACK message, the initiating UE shall update the associated 5G ProSe direct link context with the new identifiers and pass the new layer-2 IDs (i.e., initiating UE's new layer-2 ID for 5G ProSe direct communication and target UE's new layer-2 ID for 5G ProSe direct communication) along with the PC5 link identifier down to the lower layer. Then the initiating UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

The initiating UE shall continue to receive traffic with the old layer-2 IDs (i.e., initiating UE's old layer-2 ID for 5G ProSe direct communication and target UE's old layer-2 ID for 5G ProSe direct communication) from the target UE until it receives traffic with the new layer-2 IDs (i.e., initiating UE's new layer-2 ID and target UE's new layer-2 ID) from the target UE.

Here is an example of text proposal related to the target end UE with above solution.
<Option1 of the Text Proposal>
7.2.4.3 5G ProSe Direct Link Identifier Update Procedure Accepted by the Target UE Upon receipt of a PROSE DIRECT LINK IDENTIFIER UPDATE REQUEST message, if the target UE determines:
a) the 5G ProSe direct link associated with this request message is still valid; and
b) the timer T5083 for the 5G ProSe direct link identified by this request message is not running,
then the target UE accepts this request and responds with a PROSE DIRECT LINK IDENTIFIER UPDATE ACCEPT message.

If the target UE is a 5GProSe layer-3 UE-to-UE relay UE and IP address/prefix needed indication is received from the initiating UE, the 5G ProSe layer-3 UE-to-UE relay UE assigns a new IP address/prefix to the initiating UE.

If the target UE is a 5G ProSe layer-3 UE-to-UE relay UE, the 5G ProSe layer-3 UE-to-UE relay UE may initiate the 5G ProSe UE to UE relay update procedure as specified in clause 7.2.13. The target UE shall create the PROSE DIRECT LINK IDENTIFIER UPDATE ACCEPT message. In this message, the target UE:
a) shall include the target UE's new layer-2 ID assigned by itself;
b) shall include the new LSB of $K_{NRP-sess}$ ID;
c) shall include the initiating UE's new MSB of $K_{NRP-sess}$ ID;
d) shall include the initiating UE's new layer-2 ID;
e) shall include the target UE's new application layer ID if received from upper layer;
f) shall include the initiating UE's new IP address/prefix if received from the initiating UE and IP communication is used or if IP address/prefix needed indication is received from the initiating UE and IP communication is used;
g) shall include the initiating UE's new application layer ID if received from the initiating UE; and
h) shall include the target UE's new IP address/prefix if IP communication is used and changed and the 5G ProSe direct link is not for 5G ProSe direct communication between 5G ProSe layer-2 remote UE and 5G ProSe layer-2 UE-to-network relay UE.

After the PROSE DIRECT LINK IDENTIFIER UPDATE ACCEPT message is generated, the target UE shall pass this message to the lower layers for transmission along with the initiating UE's old layer-2 ID for 5G ProSe direct communication and the target UE's old layer-2 ID for 5G ProSe direct communication and start timer T5083. The UE shall not send a new PROSE DIRECT LINK IDENTIFIER UPDATE ACCEPT message to the same initiating UE while timer T5083 is running. Ifthe 5G ProSe direct link identifier update procedure is initiated between the source 5G ProSe end UE and the target UE acting as the target 5G ProSe end UE via the 5G ProSe UE-to-UE relay UE, the target UE shall initiate a 5G ProSe direct link identifier update procedure with the 5G ProSe UE-to-UE relay UE.

Before target UE receives the traffic using the new layer-2 IDs, the target UE shall continue to receive the traffic with the old layer-2 IDs (i.e., initiating UE's old layer-2 ID and target UE's old layer-2 ID) from initiating UE.

Before target UE receives the PROSE DIRECT LINK IDENTIFIER UPDATE ACK message from initiating UE, the target UE shall keep sending traffic to the initiating UE using the old layer-2 IDs (i.e., initiating UE's old layer-2 ID for 5G ProSe direct communication and target UE's old layer-2 ID for 5G ProSe direct communication).
<Option2 of the Text Proposal>
7.2.4.5 5G ProSe Direct Link Identifier Update Procedure Completion by the Target UE Upon receipt of the PROSE DIRECT LINK IDENTIFIER UPDATE ACK message, the target UE shall update the associated 5G ProSe direct link context with the new identifiers, pass the new layer-2 IDs (i.e., initiating UE's new layer-2 ID and target UE's new layer-2 ID) down to the lower layer, stop timer T5083 and timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. Then the target UE shall use the new layer-2 IDs (i.e., initiating UE's new layer- 2 ID for 5G ProSe direct communication and target UE's new layer-2 ID for 5G ProSe direct communication) to transmit the PCS signalling message and PC5 user plane data. If the 5G ProSe direct link identifier update procedure is initiated between the source 5G ProSe end UE and the target UE acting as the target 5G ProSe end UE via the 5G ProSe UE-to-UE relay UE, the target UE shall initiate a 5G ProSe direct link identifier update procedure with the 5G ProSe UE-to-UE relay UE.

According to 3GPP TS 24.554, the initiating UE of the LIU procedure passes the new L2IDs assigned in the LIU procedure to lower layer upon sending the LIU ACK message, and the target UE of the LIU procedure passes the new L2IDs assigned in the LIU procedure to lower layer upon reception of the LIU ACK message. If each end UE follows the concept, it would pass its new L2ID assigned in the E2E LIU procedure to lower layer upon sending or reception of the E2E LIU ACK message. This situation would cause sidelink communication problem for following transfer between each end UE and the relay UE since the relay UE does not know the new L2ID of each end UE assigned in the E2E LIU procedure. To this end, the U2U relay communication would be exceptionally released. To address this issue, (in the case that the source end UE firstly performs the E2E LIU procedure and then performs the per-hop LIU procedure) each end UE could not pass the new L2IDs assigned in the E2E LIU procedure to lower layer. In other words, each end UE could just pass the new L2IDs assigned in the per-hop LIU procedure to lower layer. In the case that the source end UE firstly performs the per-hop LIU procedure and then performs the E2E LIU procedure, similarly, each end UE could just pass the new L2IDs assigned in the per-hop LIU procedure to lower layer (and could not pass the new L2IDs assigned in the E2E LIU procedure to lower layer).

Regarding not passing new L2IDs to lower layer, here is an example of text proposal related to the source end UE.
7.2.4.4 5G ProSe Direct Link Identifier Update Procedure Acknowledged by the Initiating UE
<omitted>

Upon sending the PROSE DIRECT LINK IDENTIFIER UPDATE ACK message, the initiating UE shall update the associated 5G ProSe direct link context with the new identifiers and pass the new layer-2 IDs (i.e., initiating UE's new layer-2 ID for 5G ProSe direct communication and target UE's new layer-2 ID for 5G ProSe direct communication) along with the PCS link identifier down to the lower layer. Then the initiating UE shall use the new layer-2 IDs (i.e., initiating UE's new layer-2 ID for 5G ProSe direct communication and target UE's new layer-2 ID for 5G ProSe direct communication) to transmit the PCS signalling message and PC5 user plane data. The initiating UE acting as the source 5G ProSe end UE shall not pass the new layer-2 IDs assigned in the 5G ProSe direct link identifier update procedure initiated between the source 5G ProSe end UE and the target 5G ProSe end UE via the 5G ProSe UE-to-UE relay UE down to the lower layer.
<omitted>

Regarding not passing new L2IDs to lower layer, here is an example of text proposal related to the target end UE.
7.2.4.5 5G ProSe direct link identifier update procedure completion by the target UE Upon receipt of the PROSE DIRECT LINK IDENTIFIER UPDATE ACK message, the target UE shall update the associated 5G ProSe direct link context with the new identifiers, pass the new layer-2 IDs (i.e., initiating UE's new layer-2 ID and target UE's new layer-2 ID) down to the lower layer, stop timer T5083 and timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. Then the target UE shall use the new layer-2 IDs (i.e., initiating UE's new layer- 2 ID for 5G ProSe direct communication and target UE's new layer-2 ID for 5G ProSe direct communication) to transmit the PCS signalling message and PC5 user plane data. The target UE acting as the target 5G ProSe end UE shall not pass the new layer-2 IDs assigned in the 5G ProSe direct link identifier update procedure initiated between the source 5G ProSe end UE and the target 5G ProSe end UE via the 5G ProSe UE-to-UE relay UE down to the lower layer.

Figure 19:
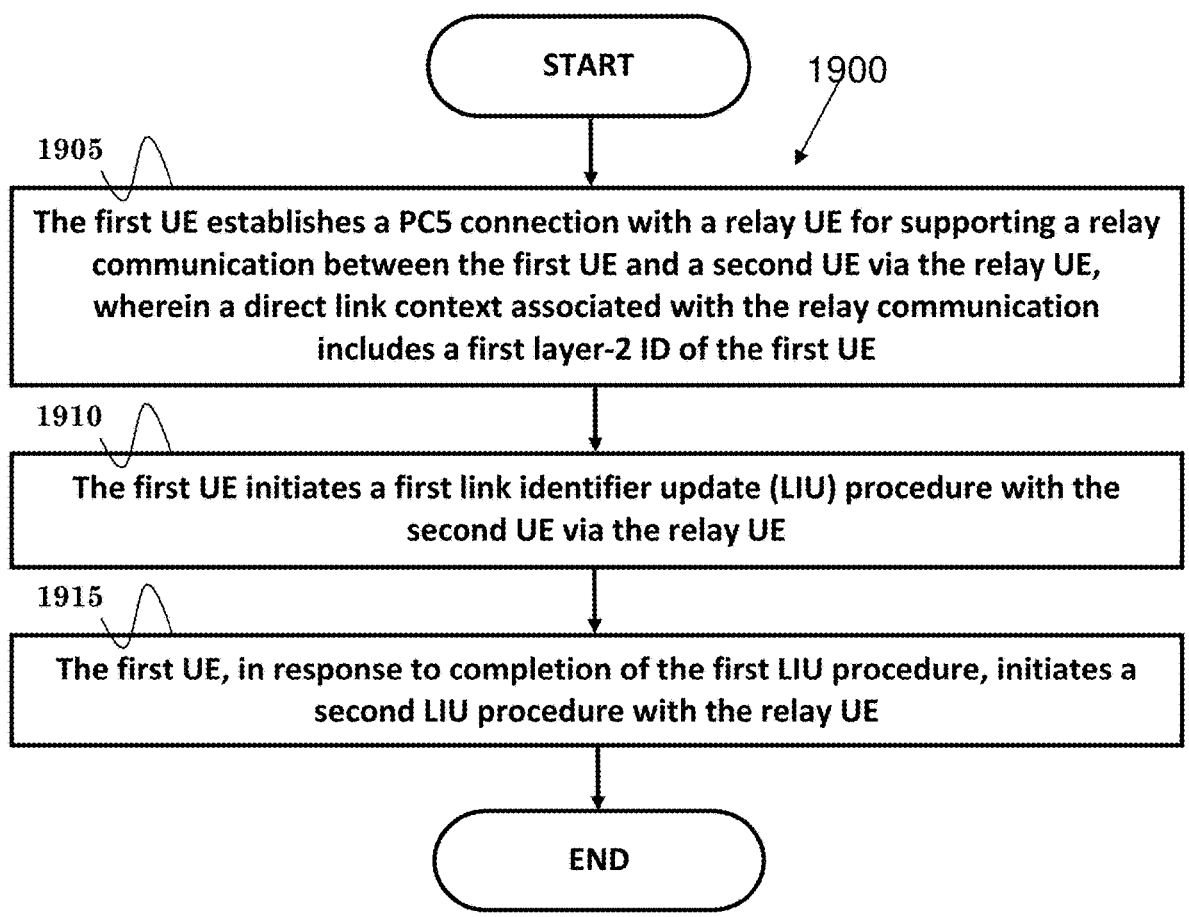
FIG. 19 is a flow chart according to one exemplary embodiment.

FIG. 19 is a flow chart 1900 for a first UE. In step 1905, the first UE establishes a PC5 connection with a relay UE for supporting a relay communication between the first UE and a second UE via the relay UE, wherein a direct link context associated with the relay communication includes a first layer-2 ID of the first UE. In step 1910, the first UE initiates a first link identifier update (LIU) procedure with the second UE via the relay UE. In step 1915, the first UE, in response to completion of the first LIU procedure, initiates a second LIU procedure with the relay UE.

In one embodiment, the first UE could send a first LIU request message to the second UE in the first LIU procedure, and the first LIU request message could include a new first layer-2 ID of the first UE. The first UE could update the direct link context with the new first layer-2 ID of the first UE. The first UE may not pass the new first layer-2 ID of the first UE to lower layer.

In one embodiment, the first UE could send a second LIU request message to the relay UE in the second LIU procedure, and the second LIU request message could include a second new first layer-2 ID of the first UE. The first UE could update the direct link context with the second new first layer-2 ID of the first UE. The first UE may pass the second new first layer-2 ID of the first UE to lower layer. The first UE could establish an end-to-end connection with the second UE for the relay communication. The direct link context could include a third layer-2 ID of the relay UE.

In one embodiment, the first UE could receive a first local ID associated with the first layer-2 ID from the relay UE. The first UE could receive a second layer-2 ID of the second UE and a second local ID associated with the second layer-2 ID from the relay UE. The direct link context could include the second layer-2 ID of the second UE.

In one embodiment, the first UE could receive a first LIU response message from the second UE in the first LIU procedure, wherein the first LIU response message includes a new second layer-2 ID of the second UE. The first UE could update the direct link context with the new second layer-2 ID of the second UE. The second LIU procedure may be initiated in response to reception of the first LIU response message from the second UE.

In one embodiment, the first UE could send a first LIU ACK message to the second UE in the first LIU procedure. The second LIU procedure could be initiated in response to sending the first LIU ACK message to the second UE.

In one embodiment, the first UE could receive a second LIU response message from the relay UE in the second LIU procedure, wherein the second LIU response message includes a new third layer-2 ID of the relay UE. The first UE could update the direct link context with the new third layer-2 ID of the relay UE. The first UE could associate the first local ID with the second new first layer-2 ID or receives a new first local ID associated with the second new first layer-2 ID from the relay UE.

In one embodiment, the first UE could receive a second new second layer-2 ID and the second local ID associated with the second new second layer-2 ID from the relay UE. The first UE could receive a second new second layer-2 ID and a new second local ID associated with the second new second layer-2 ID from the relay UE. The first UE could update the direct link context with the second new second layer-2 ID of the second UE. The (second new) first layer-2 ID could be used as a Source Layer-2 ID, and the (new) third layer-2 ID could be used as a Destination Layer-2 ID when the first UE sends a sidelink packet to the relay UE. The sidelink packet could include a SRAP packet for the second UE, and wherein a header of the SRAP packet contains the (new) first local ID and the (new) second local ID.

In one embodiment, the first UE may be a source ProSe End UE or a source remote UE. The second UE may be a target ProSe End UE or a target remote UE. The relay UE may be a UE-to-UE relay UE. The first LIU procedure may be an end-to-end LIU procedure. The second LIU procedure may be a per-hop LIU procedure.

Referring back to FIGS. 3 and 4, in one exemplary embodiment from the perspective of a first UE. The first UE 300 includes a program code 312 stored in the memory 310. The CPU 308 could execute program code 312 to enable the first UE (i) to establish a PC5 connection with a relay UE for supporting a relay communication between the first UE and a second UE via the relay UE, wherein a direct link context associated with the relay communication includes a first layer-2 ID of the first UE, (ii) to initiate a first link identifier update (LIU) procedure with the second UE via the relay UE, and (iii) to initiate, in response to completion of the first LIU procedure, a second LIU procedure with the relay UE. Furthermore, the CPU 308 can execute the program code 312 to perform all of the above-described actions and steps or others described herein.

The above solution would need per-hop LIU procedure to cooperate with E2E LIU procedure. It is also possible that per-hop LIU procedure and E2E LIU procedure may not cooperate with each other. In other words, it would be up to the source end UE's implementation to determine which of the per-hop LIU procedure or the E2E LIU procedure is performed first. Since local ID assignment may be based on L2ID, in order for aligning local ID-to-L2ID mapping common on both each ProSe End UE and Relay UE, the new L2IDs of end UEs could be aligned in the per-hop LIU signalling and the E2E LIU signalling.

Figure 20:
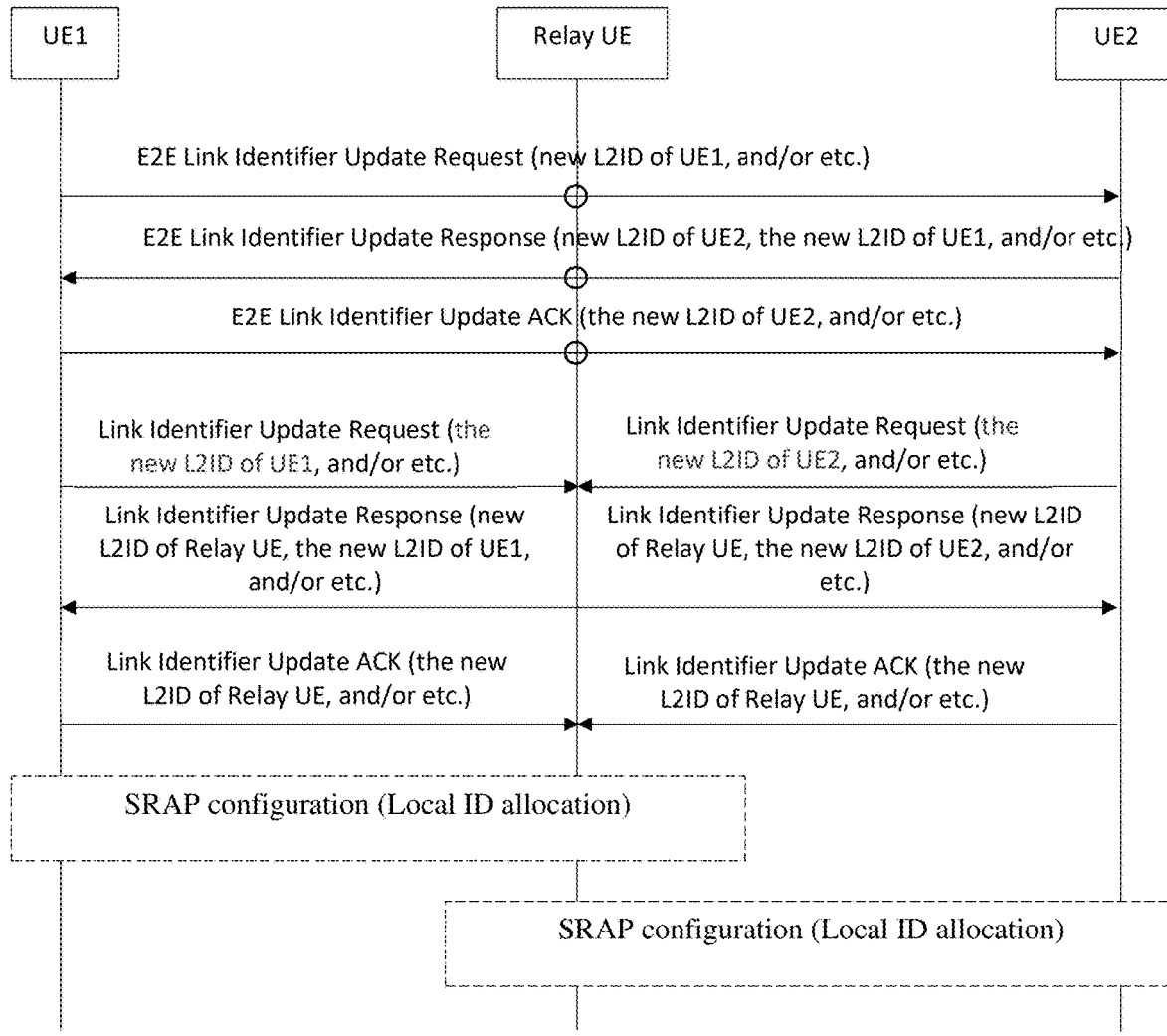
FIG. 20 is a message flow chart according to one exemplary embodiment.

UE1 may initiate a first (per-hop) link identifier update procedure with UE3. UE1 may send a first LIU request message to UE3. In the first LIU request message, the Source layer-2 ID IE field could be set to the new L2ID of UE1 as included in the E2E LIU request message. This would bring benefit that after the LIU procedures are finished the relay UE would not need to send signalling for update of local ID-to-L2ID mapping to the source end UE and the target end UE since they had known each other's new L2ID and thus to update local ID-to-L2ID mapping by themselves. And then, UE3 may respond a first LIU response message including a new L2ID (i.e. a new L2ID3) of UE3 to UE1. UE1 may then acknowledge a first LIU ACK message including the new L2ID (i.e. the new L2ID3) of UE3 to UE3. If the source end UE firstly performs the first (per-hop) LIU procedure and then performs the E2E LIU procedure, the Source layer-2 ID IE field in the E2E LIU request message could be set to the new L2ID of UE1 as included in the first LIU request message. The concept of this solution could be applied for UE2. For example, the Source layer-2 ID IE field in the E2E LIU response message could be set to the new L2ID of UE2 as included in the second LIU request message, or the Source layer-2 ID IE field in the second LIU request message could be set to the new L2ID of UE2 as included in the E2E LIU response message. The concept of this solution could be illustrated in FIG. 20.

Since the new L2IDs of end UEs may be aligned in both the per-hop LIU procedure and the E2E LIU procedure, each end UE could pass the new L2IDs assigned in the E2E LIU procedure and/or the per-hop LIU procedure to lower layer.

Here is an example of text proposal for realizing the concept of above solution.

7.2.4.2 5G ProSe direct link identifier update procedure initiation by initiating UE <omitted>

If the 5G ProSe direct link identifier update procedure is triggered by a change of the initiating UE's application layer ID, the initiating UE shall create a PROSE DIRECT LINK IDENTIFIER UPDATE REQUEST message. In this message, the initiating UE:

a) shall include the initiating UE's new application layer ID received from upper layer;

b) shall include the initiating UE's new layer-2 ID assigned by itself;

NOTE: In case of 5G ProSe layer-2 UE-to-UE relay communication, the initiating UE acting as the source 5G ProSe end UE assigns the same new layer-2 ID in the 5G ProSe direct link identifier update procedure initiated between the source 5G ProSe end UE and the target 5G ProSe end UE via the 5G ProSe UE-to-UE relay UE and in the 5G ProSe direct link identifier update procedure initiated between the source 5G ProSe end UE and the 5G ProSe UE-to-UE relay UE.

c) shall include the new MSB of KNRILsess ID;

d) shall include the new IP address/prefix if IP communication is used and the 5G ProSe direct link is not for 5G ProSe direct communication between 5G ProSe layer-2 remote UE and 5G ProSe layer-2 UE-to-network relay UE and the target UE is not a 5G ProSe layer-3 UE-to-UE relay UE;

e) shall include the new IP address/prefix, if IP communication is used, IP address/prefix needs to be changed, the target UE is a 5G ProSe layer-3 UE-to-UE relay UE and IP address/prefix of the initiating UE is allocated by the initiating UE;

f) shall include the IP address/prefix needed indication if IP communication is used, the target UE is a 5G ProSe layer-3 UE-to-UE relay UE, and IP address/prefix of the initiating UE needs to be changed and is allocated by the 5G ProSe UE-to-UE relay UE; and g) shall include the list of target end UE IP address/prefix (i.e. application layer ID(s) and IP address(es)/prefix (es)), if IP communication is used, the initiating UE's IP address/prefix needs to be changed, and the target UE is a 5G ProSe layer-3 UE-to-UE relay UE;

<omitted>

7.2.4.3 5G ProSe Direct Link Identifier Update Procedure Accepted by the Target UE <omitted>

The target UE shall create the PROSE DIRECT LINK IDENTIFIER UPDATE ACCEPT message. In this message, the target UE:

a) shall include the target UE's new layer-2 ID assigned by itself;

NOTE: In case of 5G ProSe layer-2 UE-to-UE relay communication, the target UE acting as the target 5G ProSe end UE assigns the same new layer-2 ID in the 5G ProSe direct link identifier update procedure initiated between the source 5G ProSe end UE and the target 5G ProSe end UE via the 5G ProSe UE-to-UE relay UE and in the 5G ProSe direct link identifier update procedure initiated between the 5G ProSe UE-to-UE relay UE and the target 5G ProSe end UE.

b) shall include the new LSB of K ID;

c) shall include the initiating UE's new MSB of $K_{NRP\text{-}sess}$ ID;

d) shall include the initiating UE's new layer-2 ID;

e) shall include the target UE's new application layer ID if received from upper layer;

f) shall include the initiating UE's new IP address/prefix if received from the initiating UE and IP communication is used or if IP address/prefix needed indication is received from the initiating UE and IP communication is used;

g) shall include the initiating UE's new application layer ID if received from the initiating UE; and h) shall include the target UE's new IP address/prefix if IP communication is used and changed and the 5G ProSe direct link is not for 5G ProSe direct communication between 5G ProSe layer-2 remote UE and 5G ProSe layer-2 UE-to-network relay UE.

Figure 21:
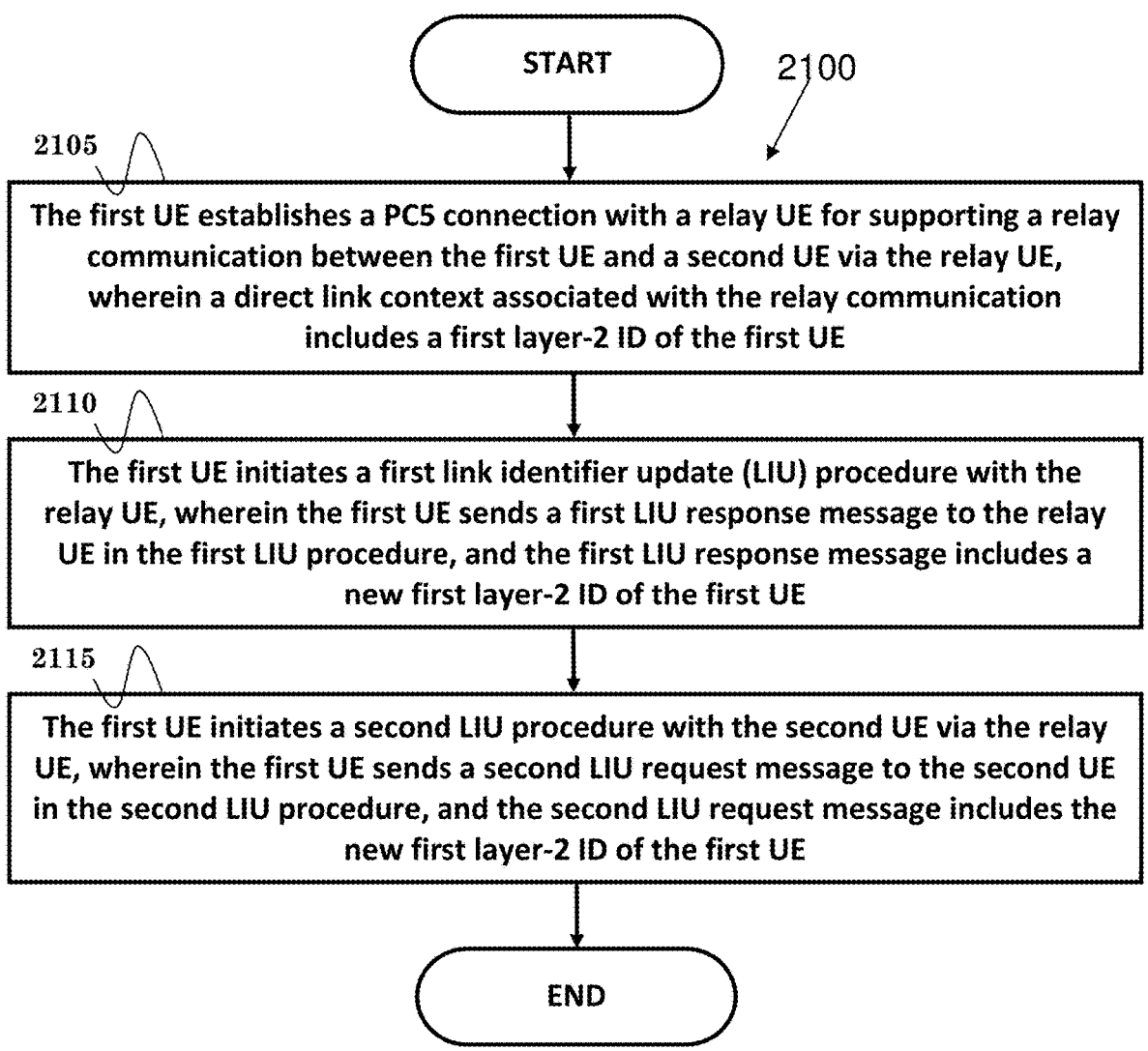
FIG. 21 is a flow chart according to one exemplary embodiment.

FIG. 21 is a flow chart 2100 for a first UE. In step 2105, the first UE establishes a PC5 connection with a relay UE for supporting a relay communication between the first UE and a second UE via the relay UE, wherein a direct link context associated with the relay communication includes a first layer-2 ID of the first UE. In step 2110, the first UE initiates a first link identifier update (LIU) procedure with the relay UE, wherein the first UE sends a first LIU response message to the relay UE in the first LIU procedure, and the first LIU response message includes a new first layer-2 ID of the first UE. In step 2115, the first UE initiates a second LIU procedure with the second UE via the relay UE, wherein the first UE sends a second LIU request message to the second UE in the second LIU procedure, and the second LIU request message includes the new first layer-2 ID of the first UE.

In one embodiment, the first UE could establish an end-to-end PC5 connection with the second UE for the relay communication. The direct link context could include a third layer-2 ID of the relay UE.

In one embodiment, the first UE could receive a first local ID associated with the first layer-2 ID from the relay UE. The first UE could receive a second layer-2 ID of the second UE and a second local ID associated with the second layer-2 ID from the relay UE. The first UE could receive a second LIU response message from the second UE in the second LIU procedure, wherein the second LIU response message includes a new second layer-2 ID of the second UE. The first UE could associate the first local ID with the new first layer-2 ID or receives a new first local ID associated with the new first layer-2 ID from the relay UE. The first UE could associate the second local ID with the new second layer-2 ID or receives a new second local ID associated with the new second layer-2 ID from the relay UE.

In one embodiment, the (new) first layer-2 ID could be used as a Source Layer-2 ID and the (new) third layer-2 ID is used as a Destination Layer-2 ID when the first UE sends a sidelink packet to the relay UE. The sidelink packet could include a SRAP packet for the second UE, wherein a header of the SRAP packet contains the (new) first local ID and the (new) second local ID.

In one embodiment, the first UE may be a source ProSe End UE or a source remote UE. The second UE may be a target ProSe End UE or a target remote UE. The relay UE may be a UE-to-UE relay UE. The first LIU procedure may be a per-hop LIU procedure. The second LIU procedure may be an end-to-end LIU procedure.

Referring back to FIGS. 3 and 4, in one exemplary embodiment from the perspective of a first UE. The first relay UE 300 includes a program code 312 stored in the memory 310. The CPU 308 could execute program code 312 to enable the first UE (i) to establish a PC5 connection with a relay UE for supporting a relay communication between the first UE and a second UE via the relay UE, wherein a direct link context associated with the relay communication includes a first layer-2 ID of the first UE, (ii) to initiate a first link identifier update (LIU) procedure with the relay UE, wherein the first UE sends a first LIU response message to the relay UE in the first LIU procedure, and the first LIU response message includes a new first layer-2 ID of the first UE, and (iii) to initiate a second LIU procedure with the second UE via the relay UE, wherein the first UE sends a second LIU request message to the second UE in the second LIU procedure, and the second LIU request message includes the new first layer-2 ID of the first UE. Furthermore, the CPU 308 can execute the program code 312 to perform all of the above-described actions and steps or others described herein.

Following the above consideration that the source end UE may determine which of the per-hop LIU procedure or the E2E LIU procedure is performed first, alternatively, the end UEs would not apply the new L2IDs included in the E2E LIU signalling (i.e. each end UE would ignore peer end UE's new L2ID received in the E2E LIU signalling). Thus, each end UE would still update the associated direct link context for the U2U relay communication with the new L2IDs received in the per-hop LIU signalling, but would not update the associated direct link context for the U2U relay communication with the new L2IDs received in the E2E LIU signalling. Based on this consideration, the relay UE may need to send new L2ID-to-local ID mapping to each end UE. The new L2ID-to-local ID mapping may be used for associating the current local ID (or a new local ID) for the peer end UE with the new L2ID of the peer end UE. The new L2ID-to-local ID mapping may be also used for associating the current local ID (or a new local ID) for this end UE with the new L2ID of this end UE. And then, each end UE may inform ProSe layer about the peer end UE's new L2ID and thus to update the associated direct link context with the peer end UE's new L2ID.

Similarly, each end UE could not pass the new L2IDs assigned in the E2E LIU procedure to lower layer.

Here is an example of text proposal for the source end UE with above solution.

7.2.4.4 5G ProSe Direct Link Identifier Update Procedure Acknowledged by the Initiating UE <omitted>

Upon sending the PROSE DIRECT LINK IDENTIFIER UPDATE ACK message, the initiating UE shall update the associated 5G ProSe direct link context with the new identifiers and pass the new layer-2 IDs (i.e., initiating UE's new layer-2 ID for 5G ProSe direct communication and target UE's new layer-2 ID for 5G ProSe direct communication) along with the PC5 link identifier down to the lower layer. If the 5G ProSe direct link identifier update procedure is initiated between the source 5G ProSe end UE and the target 5G ProSe end UE via the 5G ProSe UE-to-UE relay UE, the initiating UE acting as the source 5G ProSe end UE shall not update the associated 5G ProSe direct link context with the new layer-2 IDs. Then the initiating UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

The initiating UE shall continue to receive traffic with the old layer-2 IDs (i.e., initiating UE's old layer-2 ID for 5G ProSe direct communication and target UE's old layer-2 ID for 5G ProSe direct communication) from the target UE until it receives traffic with the new layer-2 IDs (i.e., initiating UE's new layer-2 ID and target UE's new layer-2 ID) from the target UE.

Here is an example of text proposal for the target end UE with the above solution.

7.2.4.5 5G ProSe Direct Link Identifier Update Procedure Completion by the Target UE Upon receipt of the PROSE DIRECT LINK IDENTIFIER UPDATE ACK message, the target UE shall update the associated 5G ProSe direct link context with the new identifiers, pass the new layer-2 IDs (i.e., initiating UE's new layer-2 ID and target UE's new layer-2 ID) down to the lower layer, stop timer T5083 and timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. If the 5G ProSe direct link identifier update procedure is initiated between the source 5G ProSe end UE and the target 5G ProSe end UE via the 5G ProSe UE-to-UE relay UE, the target UE acting as the target 5G ProSe end UE shall not update the associated 5G ProSe direct link context with the new layer-2 IDs. Then the target UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

Figure 22:
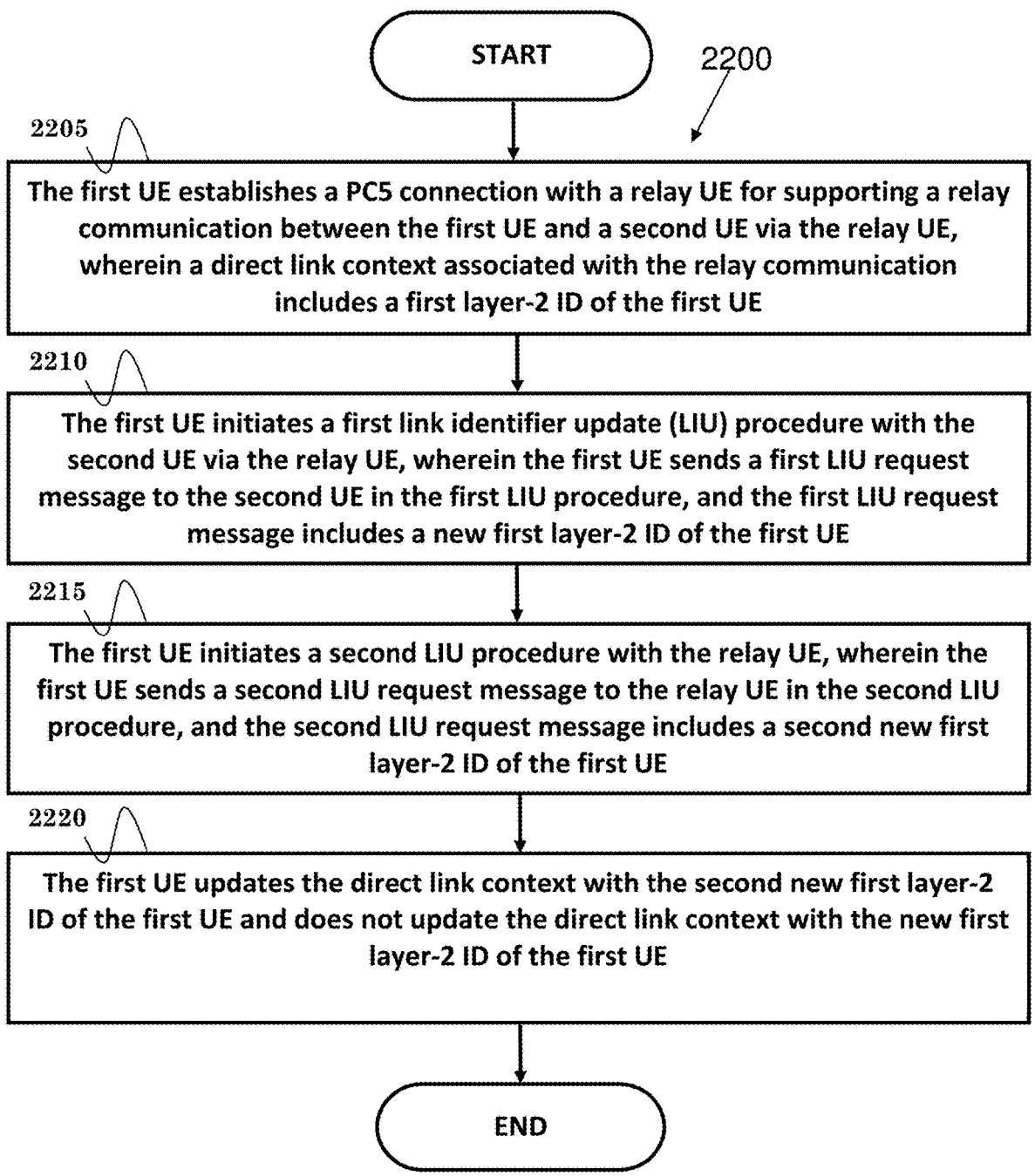
FIG. 22 is a flow chart according to one exemplary embodiment.

FIG. 22 is a flow chart 2200 for a first UE. In step 2205, the first UE establishes a PC5 connection with a relay UE for supporting a relay communication between the first UE and a second UE via the relay UE, wherein a direct link context associated with the relay communication includes a first layer-2 ID of the first UE. In step 2210, the first UE initiates a first link identifier update (LIU) procedure with the second UE via the relay UE, wherein the first UE sends a first LIU request message to the second UE in the first LIU procedure, and the first LIU request message includes a new first layer-2 ID of the first UE. In step 2215, the first UE initiates a second LIU procedure with the relay UE, wherein the first UE sends a second LIU request message to the relay UE in the second LIU procedure, and the second LIU request message includes a second new first layer-2 ID of the first UE. In step 2220, the first UE updates the direct link context with the second new first layer-2 ID of the first UE and does not update the direct link context with the new first layer-2 ID of the first UE.

In on embodiment, the first UE could establish an end-to-end connection with the second UE for the relay communication. The direct link context may include a third layer-2 ID of the relay UE.

In one embodiment, the first UE may not pass the new first layer-2 ID of the first UE to lower layer. The first UE may pass the second new first layer-2 ID of the first UE to lower layer. The first UE could receive a first local ID associated with the first layer-2 ID from the relay UE. The first UE could receive a second layer-2 ID of the second UE and a second local ID associated with the second layer-2 ID from the relay UE. The direct link context may include the second layer-2 ID of the second UE.

In one embodiment, the first UE could receive a first LIU response message from the second UE in the first LIU procedure, wherein the first LIU response message includes a new second layer-2 ID of the second UE. The first UE could receive a second LIU response message from the relay UE in the second LIU procedure, wherein the second LIU response message includes a new third layer-2 ID of the relay UE.

In one embodiment, the first UE may update the direct link context with the new third layer-2 ID of the relay UE, and may not update the direct link context with the new second layer-2 ID of the second UE. The first UE could associate the first local ID with the second new first layer-2 ID, or could receive a new first local ID associated with the second new first layer-2 ID from the relay UE. The first UE could receive a second new second layer-2 ID and the second local ID associated with the second new second layer-2 ID from the relay UE. The first UE could receive a second new second layer-2 ID and a new second local ID associated with the second new second layer-2 ID from the relay UE. The first UE could update the direct link context with the second new second layer-2 ID of the second UE.

In one embodiment, the (second new) first layer-2 ID could be used as a Source Layer-2 ID, and the (new) third layer-2 ID could be used as a Destination Layer-2 ID when the first UE sends a sidelink packet to the relay UE. The sidelink packet may include a SRAP packet for the second UE, and wherein a header of the SRAP packet contains the (new) first local ID and the (new) second local ID.

In one embodiment, the first UE may be a source ProSe End UE or a source remote UE. The second UE may be a target ProSe End UE or a target remote UE. The relay UE may be a UE-to-UE relay UE. The first LIU procedure may be an end-to-end LIU procedure. The second LIU procedure may be a per-hop LIU procedure.

Referring back to FIGS. 3 and 4, in one exemplary embodiment from the perspective of a first UE. The first UE 300 includes a program code 312 stored in the memory 310. The CPU 308 could execute program code 312 to enable the first UE (i) to establish a PC5 connection with a relay UE for supporting a relay communication between the first UE and a second UE via the relay UE, wherein a direct link context associated with the relay communication includes a first layer-2 ID of the first UE, (ii) to initiate a first link identifier update (LIU) procedure with the second UE via the relay UE, wherein the first UE sends a first LIU request message to the second UE in the first LIU procedure, and the first LIU request message includes a new first layer-2 ID of the first UE, (iii) to initiate a first link identifier update (LIU)

procedure with the second UE via the relay UE, wherein the first UE sends a first LIU request message to the second UE in the first LIU procedure, and the first LIU request message includes a new first layer-2 ID of the first UE, and (iv) to initiate a first link identifier update (LIU) procedure with the second UE via the relay UE, wherein the first UE sends a first LIU request message to the second UE in the first LIU procedure, and the first LIU request message includes a new first layer-2 ID of the first UE. Furthermore, the CPU 308 can execute the program code 312 to perform all of the above-described actions and steps or others described herein.

In one embodiment, the PC5 unicast link, PC5 connection, layer-2 link, direct link could be equivalent.

Figure 23:
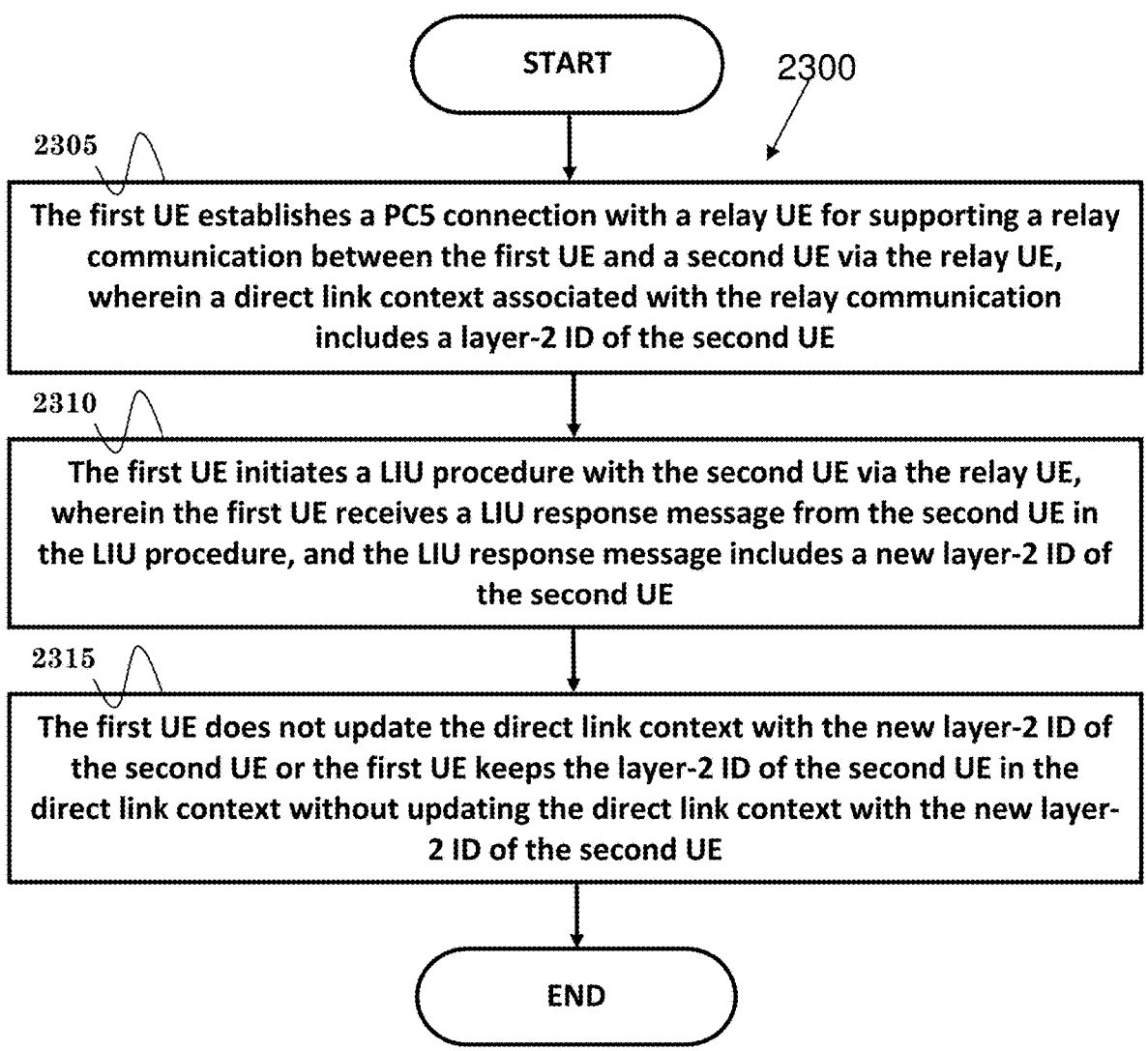
FIG. 23 is a flow chart according to one exemplary embodiment.

FIG. 23 is a flow chart 2300 for a first UE. In step 2305, the first UE establishes a PC5 connection with a relay UE for supporting a relay communication between the first UE and a second UE via the relay UE, wherein a direct link context associated with the relay communication includes a layer-2 Identity (ID) of the second UE. In step 2310, the first UE initiates a link identifier update (LIU) procedure with the second UE via the relay UE, wherein the first UE receives a LIU response message from the second UE in the LIU procedure, and the LIU response message includes a new layer-2 ID of the second UE. In step 2315, the first UE does not update the direct link context with the new layer-2 ID of the second UE or the first UE keeps the layer-2 ID of the second UE in the direct link context without updating the direct link context with the new layer-2 ID of the second UE.

In one embodiment, the first UE could send or receive a sidelink relay adaptation protocol (SRAP) packet to or from the relay UE for the relay communication after the LIU procedure is completed, wherein the SRAP packet could include a first local ID associated with the layer-2 ID of the second UE.

In one embodiment, the first UE could receive a second new layer-2 ID of the second UE and a second local ID associated with the second new layer-2 ID of the second UE from the relay UE. The first UE could receive the second new layer-2 ID of the second UE and the second local ID associated with the second new layer-2 ID of the second UE via a PC5 Radio Resource Control (RRC) message. The RRC message could be a RRCReconfigurationSidelink message. The first UE could receive the second new layer-2 ID of the second UE and the second local ID associated with the second new layer-2 ID of the second UE after the LIU procedure is completed.

In one embodiment, the first local ID associated with the layer-2 ID of the second UE could be the same as the second local ID associated with the second new layer-2 ID of the second UE.

In one embodiment, the first UE could update the direct link context with the second new layer-2 ID of the second UE.

In one embodiment, the first UE could send or receive a SRAP packet to or from the relay UE for the relay communication after receiving the second new layer-2 ID of the second UE and the second local ID associated with the second new layer-2 ID of the second UE from the relay UE, wherein the SRAP packet could include the second local ID associated with the second new layer-2 ID of the second UE.

Referring back to FIGS. 3 and 4, in one exemplary embodiment from the perspective of a first UE. The first UE 300 includes a program code 312 stored in the memory 310. The CPU 308 could execute program code 312 to enable the first UE (i) to establish a PC5 connection with a relay UE for supporting a relay communication between the first UE and a second UE via the relay UE, wherein a direct link context associated with the relay communication includes a layer-2 Identity (ID) of the second UE, (ii) to initiate a link identifier update (LIU) procedure with the second UE via the relay UE, wherein the first UE receives a LIU response message from the second UE in the LIU procedure, and the LIU response message includes a new layer-2 ID of the second UE, (iii) to not update the direct link context with the new layer-2 ID of the second UE or to keep the layer-2 ID of the second UE in the direct link context without updating the direct link context with the new layer-2 ID of the second UE. Furthermore, the CPU 308 can execute the program code 312 to perform all of the above-described actions and steps or others described herein.

Figure 24:
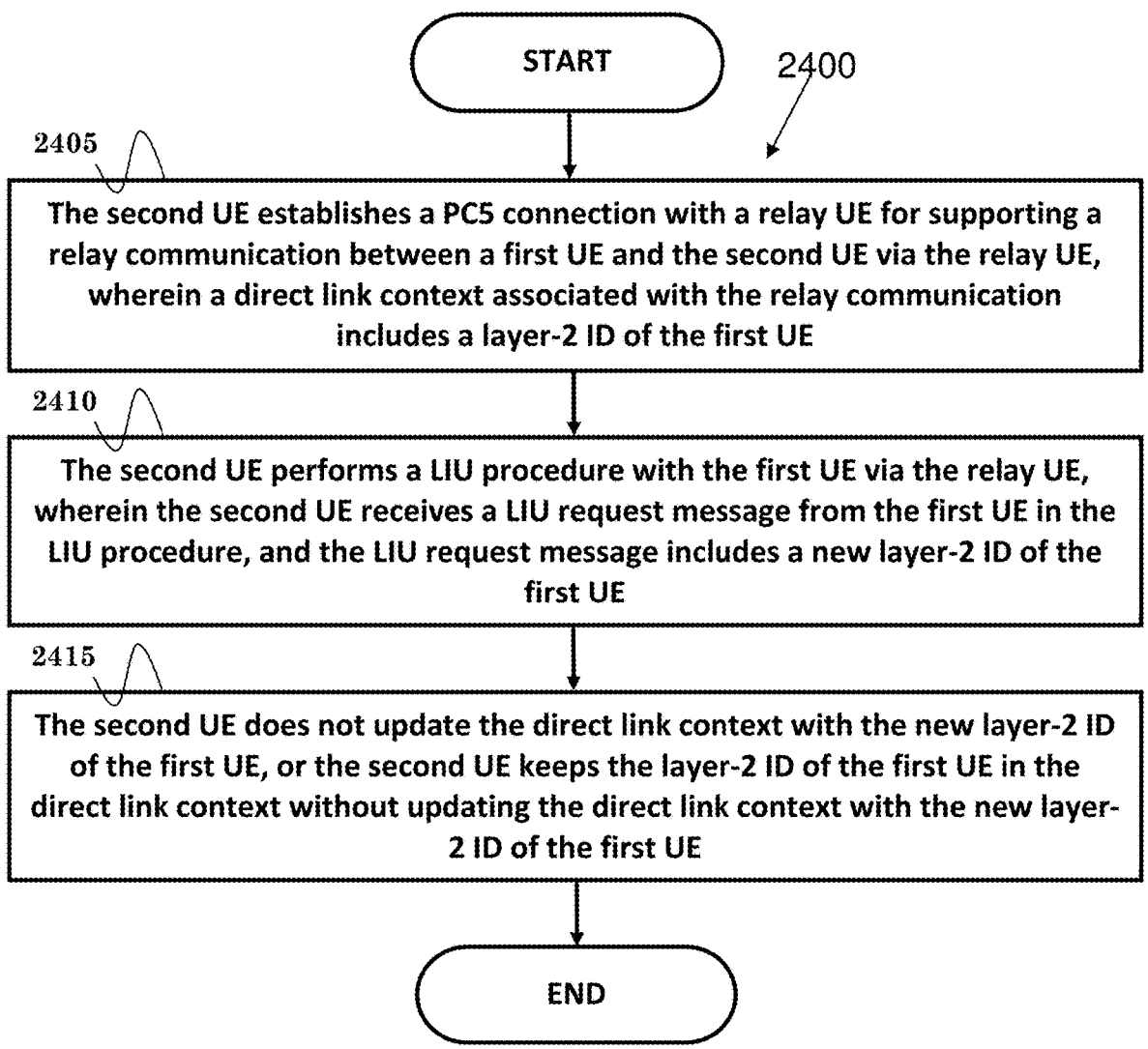
FIG. 24 is a flow chart according to one exemplary embodiment.

FIG. 24 is a flow chart 2400 for a second UE. In step 2405, the second UE establishes a PC5 connection with a relay UE for supporting a relay communication between a first UE and the second UE via the relay UE, wherein a direct link context associated with the relay communication includes a layer-2 Identity (ID) of the first UE. In step 2410, the second UE performs a link identifier update (LIU) procedure with the first UE via the relay UE, wherein the second UE receives a LIU request message from the first UE in the LIU procedure, and the LIU request message includes a new layer-2 ID of the first UE. In step 2415, the second UE does not update the direct link context with the new layer-2 ID of the first UE, or the second UE keeps the layer-2 ID of the first UE in the direct link context without updating the direct link context with the new layer-2 ID of the first UE.

In one embodiment, the second UE could send or receive a sidelink relay adaptation protocol (SRAP) packet to or from the relay UE for the relay communication after the LIU procedure is completed, wherein the SRAP packet could include a first local ID associated with the layer-2 ID of the first UE.

In one embodiment, the second UE could receive a second new layer-2 ID of the first UE and a second local ID associated with the second new layer-2 ID of the first UE from the relay UE. The second UE could receive the second new layer-2 ID of the first UE and the second local ID associated with the second new layer-2 ID of the first UE via a PC5 Radio Resource Control (RRC) message. The RRC message could be a RRCReconfigurationSidelink message. The second UE could receive the second new layer-2 ID of the first UE and the second local ID associated with the second new layer-2 ID of the first UE after the LIU procedure is completed.

In one embodiment, the first local ID associated with the layer-2 ID of the first UE could be the same as the second local ID associated with the second new layer-2 ID of the first UE.

In one embodiment, the second UE could update the direct link context with the second new layer-2 ID of the first UE.

In one embodiment, the second UE could send or receive a SRAP packet to or from the relay UE for the relay communication after receiving the second new layer-2 ID of the first UE and the second local ID associated with the second new layer-2 ID of the first UE from the relay UE, wherein the SRAP packet could include the second local ID associated with the second new layer-2 ID of the first UE.

Referring back to FIGS. 3 and 4, in one exemplary embodiment from the perspective of a second UE. The second UE 300 includes a program code 312 stored in the memory 310. The CPU 308 could execute program code 312 to enable the second UE (i) to establish a PC5 connection with a relay UE for supporting a relay communication between a first UE and the second UE via the relay UE, wherein a direct link context associated with the relay communication includes a layer-2 Identity (ID) of the first UE, (ii) to perform a link identifier update (LIU) procedure with the first UE via the relay UE, wherein the second UE receives a LIU request message from the first UE in the LIU procedure, and the LIU request message includes a new layer-2 ID of the first UE, (iii) to not update the direct link context with the new layer-2 ID of the first UE, or to keep the layer-2 ID of the first UE in the direct link context without updating the direct link context with the new layer-2 ID of the first UE. Furthermore, the CPU 308 can execute the program code 312 to perform all of the above-described actions and steps or others described herein.

In one embodiment, the above solutions could be combined. For example, the per-hop LIU procedure may be triggered by the E2E LIU procedure (or the E2E LIU procedure may be triggered by the per-hop LIU procedure) while the new L2ID of each end UE could be still aligned in both the per-hop LIU procedure and the E2E LIU procedure. As another example, the per-hop LIU procedure may be triggered by the E2E LIU procedure (or the E2E LIU procedure may be triggered by the per-hop LIU procedure) while the new L2IDs of end UEs exchanged during the E2E LIU procedure may not be applied or used.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE), comprising:
the first UE establishes a PC5 connection with a relay UE for supporting a relay communication between the first UE and a second UE via the relay UE, wherein a direct link context associated with the relay communication includes a first layer-2 Identity (ID) of the second UE;
the first UE initiates a link identifier update (LIU) procedure with the second UE via the relay UE, wherein the first UE receives a LIU response message from the second UE in the LIU procedure, and the LIU response message includes a second layer-2 ID of the second UE; and
the first UE does not update the direct link context with the second layer-2 ID of the second UE.

2. The method of claim 1, further comprising:
the first UE sends or receives a sidelink relay adaptation protocol (SRAP) packet to or from the relay UE for the relay communication after the LIU procedure is completed, wherein the SRAP packet includes a first local ID associated with the first layer-2 ID of the second UE.

3. The method of claim 1, further comprising:
the first UE receives a third layer-2 ID of the second UE and a second local Identity (ID) associated with the third layer-2 ID of the second UE from the relay UE.

4. The method of claim 3, further comprising:
the first UE updates the direct link context with the third layer-2 ID of the second UE.

5. The method of claim 3, further comprising:
the first UE sends or receives a sidelink relay adaptation protocol (SRAP) packet to or from the relay UE for the relay communication after receiving the third layer-2 ID of the second UE and the second local ID associated with the third layer-2 ID of the second UE from the relay UE, wherein the SRAP packet includes the second local ID associated with the third layer-2 ID of the second UE.

6. The method of claim 3, wherein the first UE receives the third layer-2 ID of the second UE and the second local ID associated with the third layer-2 ID of the second UE via a PC5 Radio Resource Control (RRC) message.

7. The method of claim 1, wherein the first UE keeps the first layer-2 ID of the second UE in the direct link context without updating the direct link context with the second layer-2 ID of the second UE.

8. A first User Equipment (UE), comprising:
a control circuit;
a processor installed in the control circuit; and
a memory installed in the control circuit and operatively coupled to the processor;
wherein the processor is configured to execute a program code stored in the memory to:
establish a PC5 connection with a relay UE for supporting a relay communication between the first UE and a second UE via the relay UE, wherein a direct link context associated with the relay communication includes a first layer-2 Identity (ID) of the second UE;
initiate a link identifier update (LIU) procedure with the second UE via the relay UE, wherein the first UE receives a LIU response message from the second UE in the LIU procedure, and the LIU response message includes a second layer-2 ID of the second UE; and
not update the direct link context with the second layer-2 ID of the second UE.

9. The first UE of claim 8, wherein the processor is further configured to execute a program code stored in the memory to:
send or receive a sidelink relay adaptation protocol (SRAP) packet to or from the relay UE for the relay communication after the LIU procedure is completed, wherein the SRAP packet includes a first local ID associated with the first layer-2 ID of the second UE.

10. The first UE of claim 8, wherein the processor is further configured to execute a program code stored in the memory to:
receive a third ID of the second UE and a second local Identity (ID) associated with the third layer-2 ID of the second UE from the relay UE.

11. The first UE of claim 10, wherein the processor is further configured to execute a program code stored in the memory to:
update the direct link context with the third layer-2 ID of the second UE.

12. The first UE of claim 10, wherein the processor is further configured to execute a program code stored in the memory to:
send or receive a sidelink relay adaptation protocol (SRAP) packet to or from the relay UE for the relay communication after receiving the third layer-2 ID of the second UE and the second local ID associated with the third layer-2 ID of the second UE from the relay UE, wherein the SRAP packet includes the second local ID associated with the third layer-2 ID of the second UE.

13. The first UE of claim 10, wherein the first UE receives the third layer-2 ID of the second UE and the second local ID associated with the third layer-2 ID of the second UE via a PC5 Radio Resource Control (RRC) message.

14. A method for a second User Equipment (UE), comprising:
the second UE establishes a PC5 connection with a relay UE for supporting a relay communication between a first UE and the second UE via the relay UE, wherein a direct link context associated with the relay communication includes a first layer-2 Identity (ID) of the first UE;
the second UE performs a link identifier update (LIU) procedure with the first UE via the relay UE, wherein the second UE receives a LIU request message from the first UE in the LIU procedure, and the LIU request message includes a second layer-2 ID of the first UE; and
the second UE does not update the direct link context with the second layer-2 ID of the first UE.

15. The method of claim 14, further comprising:
the second UE sends or receives a sidelink relay adaptation protocol (SRAP) packet to or from the relay UE for the relay communication after the LIU procedure is completed, wherein the SRAP packet includes a first local ID associated with the first layer-2 ID of the first UE.

16. The method of claim 14, further comprising:
the second UE receives a third layer-2 ID of the first UE and a second local Identity (ID) associated with the third layer-2 ID of the first UE from the relay UE.

17. The method of claim 16, further comprising:
the second UE updates the direct link context with the third layer-2 ID of the first UE.

18. The method of claim 16, further comprising:
the second UE sends or receives a sidelink relay adaptation protocol (SRAP) packet to or from the relay UE for the relay communication after receiving the third layer-2 ID layer-2 ID of the first UE and the second local ID associated with the third layer-2 ID layer-2 ID of the first UE from the relay UE, wherein the SRAP packet includes the second local ID associated with the third layer-2 ID layer-2 ID of the first UE.

19. The method of claim 16, wherein the second UE receives the third layer-2 ID layer-2 ID of the first UE and the second local ID associated with the third layer-2 ID layer-2 ID of the first UE via a PC5 Radio Resource Control (RRC) message.

20. The method of claim 14, wherein the first UE keeps the first layer-2 ID of the second UE in the direct link context without updating the direct link context with the second layer-2 ID of the second UE.

\* \* \* \* \*

UNITED STATES PATENT AND TRADEMARK OFFICE
CERTIFICATE OF CORRECTION

| | | Page 1 of 1 |
|---|---|---|
| PATENT NO. | : 12,356,476 B1 | |
| APPLICATION NO. | : 19/086920 | |
| DATED | : July 8, 2025 | |
| INVENTOR(S) | : Li-Te Pan et al. | |

It is certified that error appears in the above-identified patent and that said Letters Patent is hereby corrected as shown below:

In the Claims

In Column 41, Line 15, please replace Claim 20 with the following:
--20. The method of claim 13, wherein the second UE keeps the first layer-2 ID of the first UE in the direct link context without updating the direct link context with the second layer-2 ID of the first UE.--

Signed and Sealed this
Twenty-eighth Day of October, 2025

John A. Squires
*Director of the United States Patent and Trademark Office*